(12) United States Patent
Karaoguz et al.

(10) Patent No.: US 8,819,732 B2
(45) Date of Patent: Aug. 26, 2014

(54) SYSTEM AND METHOD IN A TELEVISION SYSTEM FOR PROVIDING INFORMATION ASSOCIATED WITH A USER-SELECTED PERSON IN A TELEVISION PROGRAM

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 24 days.

(21) Appl. No.: 12/880,888

(22) Filed: Sep. 13, 2010

(65) Prior Publication Data

US 2011/0067055 A1    Mar. 17, 2011

Related U.S. Application Data

(60) Provisional application No. 61/242,234, filed on Sep. 14, 2009.

(51) Int. Cl.
*G06F 3/00*     (2006.01)
*G06F 13/00*    (2006.01)
*H04N 5/445*    (2011.01)

(52) U.S. Cl.
USPC .................... 725/40; 725/38; 725/60; 725/61

(58) Field of Classification Search
USPC ........................................ 725/38, 40, 60–61
See application file for complete search history.

(56) References Cited

U.S. PATENT DOCUMENTS

| | | |
|---|---|---|
| 5,111,511 A | 5/1992 | Ishii et al. |
| 5,408,258 A | 4/1995 | Kolessar |
| 5,543,851 A | 8/1996 | Chang |
| 5,708,845 A | 1/1998 | Wistendahl |
| 5,718,845 A | 2/1998 | Drost |
| 5,721,584 A | 2/1998 | Yoshinobu et al. |
| 5,727,141 A | 3/1998 | Hoddie |
| 5,793,361 A | 8/1998 | Kahn et al. |
| 5,929,849 A | 7/1999 | Kikinis |
| 6,097,441 A | 8/2000 | Allport |
| 6,122,660 A | 9/2000 | Baransky et al. |
| 6,255,961 B1 | 7/2001 | Van Ryzin et al. |
| 6,314,569 B1 | 11/2001 | Chernock et al. |
| 6,349,410 B1 | 2/2002 | Lortz |
| 6,407,779 B1 | 6/2002 | Herz |
| 6,931,660 B1 | 8/2005 | Kalluri et al. |
| 7,053,965 B1 | 5/2006 | Fan |
| 7,057,670 B2 | 6/2006 | Kikinis |
| 7,102,616 B1 | 9/2006 | Sleator |

(Continued)

FOREIGN PATENT DOCUMENTS

| | | |
|---|---|---|
| WO | WO 2007/137611 | 12/2007 |
| WO | WO 2009/033500 A1 | 3/2009 |

OTHER PUBLICATIONS

Office Action from related U.S. Appl. No. 12/881,004 dated Nov. 1, 2012.

(Continued)

*Primary Examiner* — Mulugeta Mengesha

(74) *Attorney, Agent, or Firm* — Brinks Gilson & Lione

(57) ABSTRACT

A system and method in a television system for providing information associated with a user-selected person in a television program, substantially as shown in and/or described in connection with at least one of the figures, as set forth more completely in the claims.

33 Claims, 7 Drawing Sheets

(56) References Cited

U.S. PATENT DOCUMENTS

| | | | |
|---|---|---|---|
| 7,301,530 B2 | 11/2007 | Lee et al. | |
| 7,344,084 B2 | 3/2008 | DeCosta | |
| 7,535,456 B2 | 5/2009 | Liberty | |
| 7,536,706 B1 | 5/2009 | Sezan | |
| 7,612,748 B2 | 11/2009 | Tateuchi | |
| 7,631,338 B2 | 12/2009 | Del Sesto et al. | |
| 7,805,747 B2 | 9/2010 | Klappert | |
| 7,890,380 B2* | 2/2011 | Stefanik et al. | 705/26.1 |
| 7,987,478 B2 | 7/2011 | Minor | |
| 8,095,423 B2 | 1/2012 | Nichols | |
| 8,181,212 B2 | 5/2012 | Sigal | |
| 8,223,136 B2 | 7/2012 | Hu et al. | |
| 8,359,628 B2 | 1/2013 | Kitaru et al. | |
| 8,421,746 B2 | 4/2013 | Igoe | |
| 8,608,535 B2 | 12/2013 | Weston | |
| 2001/0019368 A1 | 9/2001 | Holme et al. | |
| 2001/0023436 A1 | 9/2001 | Srinivasan | |
| 2001/0047298 A1* | 11/2001 | Moore et al. | 705/14 |
| 2002/0040482 A1 | 4/2002 | Sextro | |
| 2002/0042925 A1 | 4/2002 | Ebisu | |
| 2002/0056136 A1 | 5/2002 | Wistendahl | |
| 2002/0069405 A1* | 6/2002 | Chapin et al. | 725/32 |
| 2002/0078446 A1 | 6/2002 | Dakss | |
| 2002/0090114 A1 | 7/2002 | Rhoads | |
| 2002/0136432 A1 | 9/2002 | Koike et al. | |
| 2003/0005445 A1 | 1/2003 | Schein | |
| 2003/0023981 A1 | 1/2003 | Lemmons | |
| 2003/0035075 A1 | 2/2003 | Butler et al. | |
| 2003/0115602 A1 | 6/2003 | Knee | |
| 2003/0145326 A1 | 7/2003 | Gutta et al. | |
| 2003/0212996 A1 | 11/2003 | Wolzien | |
| 2003/0236752 A1 | 12/2003 | Dawson et al. | |
| 2004/0078814 A1 | 4/2004 | Allen | |
| 2004/0119701 A1 | 6/2004 | Mulligan et al. | |
| 2004/0167855 A1* | 8/2004 | Cambridge | 705/42 |
| 2004/0221025 A1 | 11/2004 | Johnson et al. | |
| 2004/0236865 A1 | 11/2004 | Ullman | |
| 2005/0028208 A1 | 2/2005 | Ellis | |
| 2005/0153687 A1 | 7/2005 | Niemenmaa et al. | |
| 2005/0193425 A1 | 9/2005 | Sull et al. | |
| 2005/0229227 A1 | 10/2005 | Rogers | |
| 2005/0234782 A1* | 10/2005 | Schackne et al. | 705/27 |
| 2005/0251835 A1 | 11/2005 | Scott | |
| 2005/0262542 A1 | 11/2005 | DeWeese et al. | |
| 2006/0037044 A1 | 2/2006 | Daniels | |
| 2006/0099964 A1 | 5/2006 | Barrese et al. | |
| 2006/0152489 A1 | 7/2006 | Sweetser et al. | |
| 2006/0174273 A1 | 8/2006 | Park | |
| 2006/0241864 A1 | 10/2006 | Rosenberg | |
| 2006/0259930 A1* | 11/2006 | Rothschild | 725/81 |
| 2006/0282847 A1 | 12/2006 | Gupte | |
| 2007/0097275 A1 | 5/2007 | Dresti et al. | |
| 2007/0130581 A1 | 6/2007 | Del Sesto et al. | |
| 2007/0157260 A1 | 7/2007 | Walker | |
| 2007/0195205 A1 | 8/2007 | Lowe | |
| 2007/0266406 A1* | 11/2007 | Aravamudan et al. | 725/57 |
| 2007/0277201 A1 | 11/2007 | Wong | |
| 2007/0300263 A1 | 12/2007 | Barton | |
| 2008/0052750 A1 | 2/2008 | Grunnet-Jepsen | |
| 2008/0066097 A1 | 3/2008 | Park et al. | |
| 2008/0066129 A1 | 3/2008 | Katcher et al. | |
| 2008/0109851 A1 | 5/2008 | Heather | |
| 2008/0136754 A1 | 6/2008 | Tsuzaki et al. | |
| 2008/0172693 A1 | 7/2008 | Ludvig | |
| 2008/0204603 A1 | 8/2008 | Hattori | |
| 2008/0204605 A1 | 8/2008 | Tsai | |
| 2008/0209480 A1* | 8/2008 | Eide et al. | 725/87 |
| 2009/0021473 A1 | 1/2009 | Grant et al. | |
| 2009/0037947 A1 | 2/2009 | Patil | |
| 2009/0077394 A1 | 3/2009 | Tsai et al. | |
| 2009/0083815 A1 | 3/2009 | McMaster et al. | |
| 2009/0165041 A1 | 6/2009 | Penberthy et al. | |
| 2009/0165048 A1 | 6/2009 | Nishimura | |
| 2009/0187862 A1 | 7/2009 | Dacosta | |
| 2009/0199259 A1 | 8/2009 | Alao et al. | |
| 2009/0217317 A1 | 8/2009 | White | |
| 2009/0235312 A1 | 9/2009 | Morad | |
| 2009/0237572 A1 | 9/2009 | Kishimoto | |
| 2009/0296686 A1 | 12/2009 | Pirani et al. | |
| 2010/0064320 A1 | 3/2010 | Angiolillo et al. | |
| 2010/0098074 A1 | 4/2010 | Kokernak | |
| 2010/0157152 A1 | 6/2010 | Weitbruch et al. | |
| 2010/0162303 A1 | 6/2010 | Cassanova | |
| 2011/0063523 A1 | 3/2011 | Karaoguz et al. | |
| 2011/0066929 A1 | 3/2011 | Karaoguz et al. | |
| 2011/0067062 A1 | 3/2011 | Karaoguz et al. | |
| 2011/0067063 A1 | 3/2011 | Karaoguz et al. | |
| 2011/0067064 A1 | 3/2011 | Karaoguz et al. | |
| 2011/0067069 A1 | 3/2011 | Karaoguz et al. | |
| 2011/0141013 A1 | 6/2011 | Matthews | |
| 2011/0179435 A1 | 7/2011 | Cordray | |
| 2012/0079525 A1 | 3/2012 | Ellis et al. | |

OTHER PUBLICATIONS

Final Office Action from related U.S. Appl. No. 12/881,067 dated Oct. 9, 2012.
Office Action from related U.S. Appl. No. 12/851,075 dated Sep. 5, 2012.
Office Action from related U.S. Appl. No. 12/774,221 dated Aug. 29, 2012.
Final Office Action from related U.S. Appl. No. 12/881,110 dated Oct. 17, 2012.
Office Action from related U.S. Appl. No. 12/850,866 dated Oct. 4, 2012.
Final Office Action from related U.S. Appl. No. 12/850,911 dated Oct. 5, 2012.
Final Office Action from related U.S. Appl. No. 12/880,851 dated Nov. 14, 2012.
Office Action from related U.S. Appl. No. 12/774,321 dated Nov. 14, 2012.
Office Action from related U.S. Appl. No. 12/880,530 dated Aug. 2, 2012.
Office Action from related U.S. Appl. No. 12/880,594 dated Jun. 19, 2012.
Office Action from related U.S. Appl. No. 12/880,668 dated Jul. 2, 2012.
Office Action from related U.S. Appl. No. 12/881,067 dated Jun. 27, 2012.
Office Action from related U.S. Appl. No. 12/881,096 dated Jun. 19, 2012.
Office Action from related U.S. Appl. No. 12/880,749 dated Aug. 30, 2012.
Office Action from related U.S. Appl. No. 12/851,036 dated Aug. 22, 2012.
Office Action from related U.S. Appl. No. 12/880,851 dated Jun. 20, 2012.
Office Action from related U.S. Appl. No. 12/881,110 dated May 29, 2012.
Office Action from related U.S. Appl. No. 12/774,380 dated Jul. 9, 2012.
Office Action from related U.S. Appl. No. 12/850,832 dated Aug. 15, 2012.
Office Action from related U.S. Appl. No. 12/850,866 dated Jun. 20, 2012.
Office Action from related U.S. Appl. No. 12/850,911 dated Jun. 20, 2012.
Office Action from related U.S. Appl. No. 12/850,945 dated Aug. 2, 2012.
Office Action from related U.S. Appl. No. 12/880,965 dated Jun. 25, 2012.
Final Office Action from related U.S. Appl. No. 12/774,321 dated Jun. 27, 2013.
Non-Final Office Action from related U.S. Appl. No. 12/774,154 dated Aug. 14, 2013.
Non-Final Office Action from related U.S. Appl. No. 12/850,945 dated Aug. 27, 2013.
Non-Final Office Action from related U.S. Appl. No. 12/880,668 dated Jun. 10, 2013.

(56) References Cited

OTHER PUBLICATIONS

Final Office Action from related U.S. Appl. No. 12/774,380 dated Jun. 11, 2013.
Final Office Action from related U.S. Appl. No. 12/880,851 dated Sep. 10, 2013.
Non-Final Office Action from related U.S. Appl. No. 12/881,031 dated Sep. 10, 2013.
Office Action from related U.S. Appl. No. 12/774,154 dated Dec. 5, 2012.
Final Office Action from related U.S. Appl. No. 12/880,530 dated Jan. 14, 2013.
Final Office Action from related U.S. Appl No. 12/880,594 dated Nov. 28, 2012.
Office Action from related U.S. Appl. No. 12/880,668 dated Jan. 2, 2013.
Final Office Action from related U.S. Appl. No. 12/881,096 dated Jan. 23, 2013.
Final Office Action from related U.S. Appl. No. 12/880,749 dated Feb. 1, 2013.
Office Action from related U.S. Appl. No. 12/774,380 dated Jan. 8, 2013.
Final Office Action from related U.S. Appl. No. 12/880,965 dated Jan. 11, 2013.
Final Office Action from related U.S. Appl. No. 12/774,154 dated Apr. 10, 2013.
Final Office Action from related U.S. Appl. No. 12/881,004 dated Mar. 7, 2013.
Final Office Action from related U.S. Appl. No. 12/851,036 dated Feb. 26, 2013.
Final Office Action from related U.S. Appl. No. 12/851,075 dated Mar. 5, 2013.
Final Office Action from related U.S. Appl. No. 12/774,221 dated Feb. 26, 2013.
Final Office Action from related U.S. Appl. No. 12/850,832 dated Feb. 25, 2013.
Final Office Action from related U.S. Appl. No. 12/850,866 dated Mar. 29, 2013.
Final Office Action from related U.S. Appl. No. 12/850,945 dated Apr. 26, 2013.
Intel, "Intel Ethernet Switch Converged Enhanced Ethernet (CEE) and Datacenter Bridging (DCB)", White Paper, Feb. 2009, pp. 1-14.
Non-Final Office Action from related U.S. Appl. No. 12/851,075 dated Apr. 4, 2014.
Non-Final Office Action from related U.S. Appl. No. 12/881,110 dated Apr. 7, 2014.
Non-Final Office Action from related U.S. Appl. No. 12/880,530 dated Apr. 9, 2014.
Non-Final Office Action from related U.S. Appl. No. 12/774,380 dated Apr. 15, 2014.
Non-Final Office Action from related U.S. Appl. No. 12/881,067 dated May 9, 2014.
Final Office Action from related U.S. Appl. No. 12/774,321 dated Jun. 2, 2014.

* cited by examiner

SYSTEM AND METHOD IN A TELEVISION SYSTEM FOR PROVIDING INFORMATION ASSOCIATED WITH A USER-SELECTED PERSON IN A TELEVISION PROGRAM

CROSS-REFERENCE TO RELATED APPLICATIONS/INCORPORATION BY REFERENCE

This patent application is related to and claims priority from provisional patent application Ser. No. 61/242,234 filed Sep. 14, 2009, and titled "TELEVISION SYSTEM," the contents of which are hereby incorporated herein by reference in their entirety. This patent application is also related to U.S. patent application Ser. No. 12/880,530, filed concurrently herewith, titled "SYSTEM AND METHOD IN A DISTRIBUTED SYSTEM FOR RESPONDING TO USER-SELECTION OF AN OBJECT IN A TELEVISION PROGRAM"; U.S. patent application Ser. No. 12/880,594, filed concurrently herewith, titled "SYSTEM AND METHOD IN A LOCAL TELEVISION SYSTEM FOR RESPONDING TO USER-SELECTION OF AN OBJECT IN A TELEVISION PROGRAM"; U.S. patent application Ser. No. 12/880,668, filed concurrently herewith, titled "SYSTEM AND METHOD IN A TELEVISION SYSTEM FOR RESPONDING TO USER-SELECTION OF AN OBJECT IN A TELEVISION PROGRAM BASED ON USER LOCATION"; U.S. patent application Ser. No. 12/881,067, filed concurrently herewith, titled "SYSTEM AND METHOD IN A TELEVISION SYSTEM FOR PRESENTING INFORMATION ASSOCIATED WITH A USER-SELECTED OBJECT IN A TELEVISION PROGRAM"; U.S. patent application Ser. No. 12/881,096, filed concurrently herewith, titled "SYSTEM AND METHOD IN A TELEVISION SYSTEM FOR PRESENTING INFORMATION ASSOCIATED WITH A USER-SELECTED OBJECT IN A TELEVISION PROGRAM"; U.S. patent application Ser. No. 12/880,749, filed concurrently herewith, titled "SYSTEM AND METHOD IN A TELEVISION SYSTEM FOR RESPONDING TO USER-SELECTION OF AN OBJECT IN A TELEVISION PROGRAM UTILIZING AN ALTERNATIVE COMMUNICATION NETWORK"; U.S. patent application Ser. No. 12/880,851, filed concurrently herewith, titled "SYSTEM AND METHOD IN A TELEVISION SYSTEM FOR PROVIDING ADVERTISING INFORMATION ASSOCIATED WITH A USER-SELECTED OBJECT IN A TELEVISION PROGRAM"; and U.S. patent application Ser. No. 12/881,110, filed concurrently herewith, titled "SYSTEM AND METHOD IN A TELEVISION FOR PROVIDING INFORMATION ASSOCIATED WITH A USERSELECTED INFORMATION ELEMENT IN A TELEVISION PROGRAM". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present television systems are incapable of responding to user-selection of objects related to people in a television program. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a television system for providing information associated with a user-selected person in a television program, substantially as shown in and/or described in connection with at least one of the figures, as set forth more completely in the claims, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
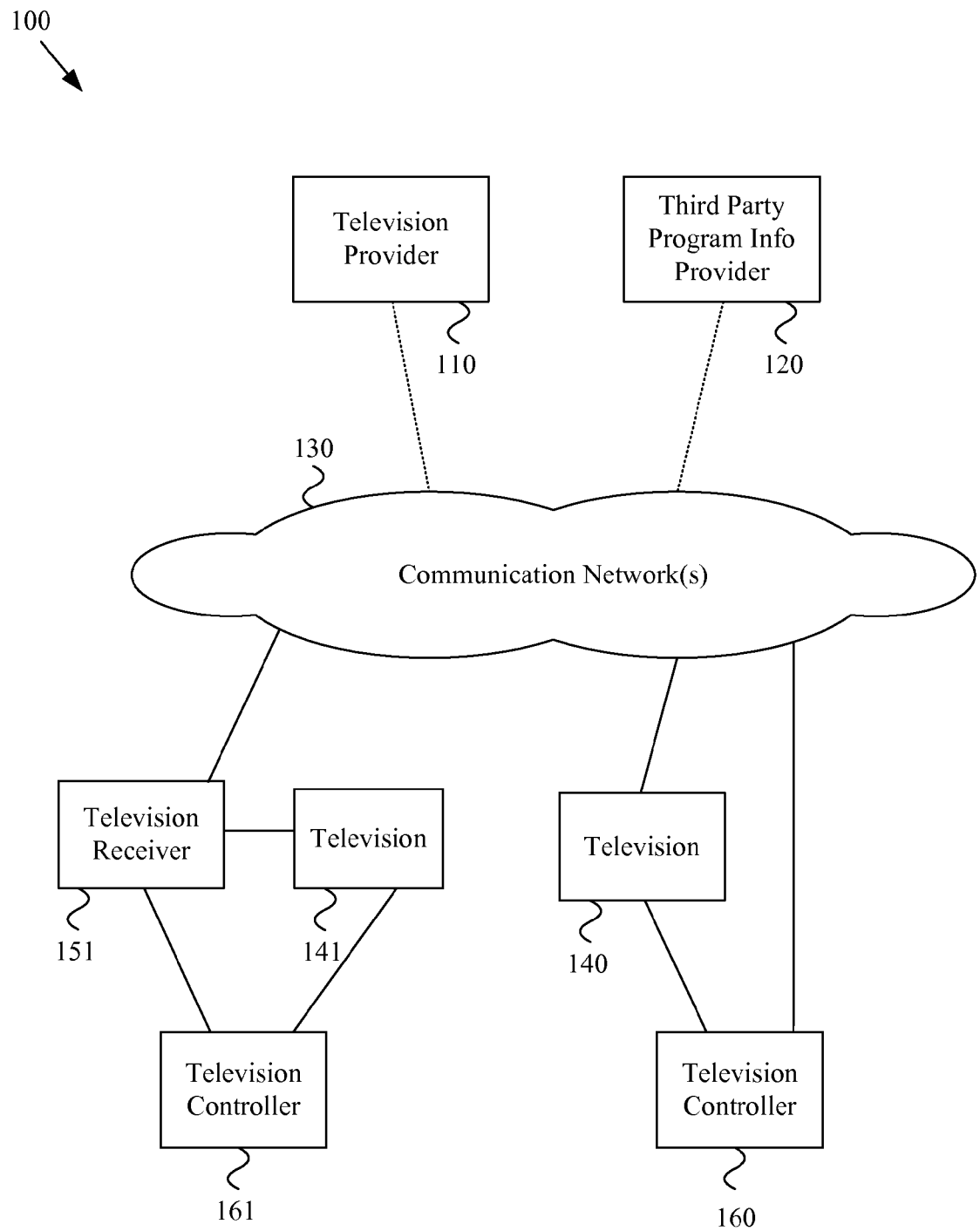
FIG. 1 is a diagram illustrating an exemplary television system, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various television system modules (e.g., television modules, television receiver modules, television controller modules, modules of a user's local television system, modules of a geographically distributed television system, etc.). It should be noted that the following discussion of such various modules is segmented into such modules for the sake of illustrative clarity. However, in actual implementation, the boundaries between various modules may be clear or may be blurred. For example, any or all of the functional modules discussed herein may share various hardware and/or software components. For example, any or all of the functional modules discussed herein may be implemented wholly or in-part by a shared processor executing software instructions. Additionally, various software sub-modules, which may be executed by one or more processors, may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, television, television control device, television provider, television programming provider, television receiver, video recording device, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

The following discussion may at times refer to an on-screen pointing location. Such a pointing location refers to a location on the television screen (e.g., a primary television screen, a secondary television screen, etc.) to which a user (either directly or with a pointing device) is pointing. Such a pointing location is to be distinguished from other types of on-screen location identification, such as, for example, using arrow keys and/or a mouse to move a cursor or to traverse blocks (e.g., on an on-screen program guide) without pointing. Various aspects of the present invention, while referring to on-screen pointing location, are also readily extensible to such other forms of on-screen location identification.

Additionally, the following discussion will at times refer to television programming. Such television programming generally includes various types of television programming (e.g., television programs, news programs, sports programs, music television, movies, television series programs and/or associated advertisements, educational programs, live or recorded television programming, broadcast/multicast/unicast television programming, etc.). Such television programming may, for example, comprise real-time television broadcast programming (or multicast or unicast television programming) and/or user-stored television programming that is stored in a user device (e.g., a VCR, PVR, etc.). Such television programming video content is to be distinguished from other non-programming video content that may be displayed on a television screen (e.g., an electronic program guide, user interface menu, a television set-up menu, a typical web page, a document, a graphical video game, etc.). Various aspects of the present invention may, for example in a television system, comprise receiving a television program, presenting such received television program to a user, determining an object in the television program that has been selected by the user, determining based on the user-selected object one or more actions to perform with entities remote from the user's local television system, and performing such determined one or more actions.

Also, the following discussion will at times refer to user-selectable objects in television programming. Such user-selectable objects include both animate (i.e., living) and inanimate (i.e., non-living) objects, both still and moving. Such objects may, for example, comprise characteristics of any of a variety of objects present in television programming. Such objects may, for example and without limitation, comprise inanimate objects, such as consumer good objects (e.g., a general consumer product, clothing, automobiles or other vehicles, shoes, jewelry, furniture, restaurant, food, beverages, appliances, electronics, toys, artwork, cosmetics, recreational vehicles, sports equipment, safety equipment, computer equipment, communication devices, books, home improvement products, medication, etc.), consumer service objects (e.g., objects (e.g., signs, banners, flyers, buildings, vehicles, etc.) related to health services, a fitness center, a rehabilitation center, restaurant services, food services, entertainment services, repair services, insurance services, financial services, security services, transportation services, shopping services, delivery services, education services, communication services, vacation services, rental services, information services, legal services, etc.), premises objects (e.g., business locations, stores, hotels, signs, doors, buildings, landmarks, historical sites, entertainment venues, hospitals, government buildings, etc.), objects related to general services (e.g., objects related to free transportation, objects related to emergency services, objects related to general government services, objects related to free entertainment services, etc.), objects related to location (e.g., parks, landmarks, streets, signs, road signs, etc.), etc. Such objects may, for example, comprise animate objects, such as people (e.g., actors/actresses, athletes, musicians, salespeople, commentators, reporters, analysts, hosts/hostesses, entertainers, spokespeople, models, politicians, public servants, law enforcement personnel, medical personnel, event officials, etc.), animals (e.g., pets, zoo animals, wild animals, etc.) and plants (e.g., flowers, trees, shrubs, fruits, vegetables, cacti, etc.).

Turning first to FIG. 1, such figure is a diagram illustrating a non-limiting exemplary television system 100 in accordance with various aspects of the present invention. The exemplary system 100 includes a television provider 110. The television provider 110 may, for example, comprise a television network company, a cable company, a movie-providing company, a news company, an educational institution, etc. The television provider 110 may, for example, be an original source of television programming (or related information). Also for example, the television provider 110 may be a communication company that provides programming distribution services (e.g., a cable television company, a satellite television company, a telecommunication company, a data network provider, etc.). The television provider 110 may, for example, provide television programming and non-programming information and/or video content. The television provider 110 may, for example, provide information related to a television program (e.g., information describing or otherwise related to selectable objects in programming, commerce information related to a consumer good and/or service, etc.). The television provider 110 may, for example, provide any or all of the types of information discussed herein. The television provider 110 may, for example, operate to (which includes "operate when enabled to") perform any or all of the functionality discussed herein.

The exemplary television system 100 may also include a third party program information provider 120. Such a provider may, for example, provide information related to a television program. Such information may, for example, comprise information describing selectable objects in programming, information to provide to a user upon selection of a selectable object in programming, information related to various actions that may be performed (e.g., with networked entities remote from the user's local television system) upon user selection of a selectable object, commerce information related to a consumer good and/or service program, guide information, etc. The third party program information provider 120 may, for example, provide any or all of the types of information discussed herein. The third party program information provider 120 may, for example, operate to (which includes "operate when enabled to") perform any or all of the functionality discussed herein.

In various exemplary system scenarios, the third party program information provider 120 may, for example, correspond to a source of a consumer good and/or service (e.g., a commercial enterprise, a manufacturer, a supplier, a distributor, a retailer, business, Internet business, brick-and-mortar business, etc.). Such a consumer good and/or service may, for example, be related to a user-selected person in a television program (e.g., related to consumer goods and/or services endorsed by a selected person, provided by a selected person, provided by a commercial enterprise associated with a selected person, etc.). Such a third party program information provider 120 may also, for example, comprise a repository for information of one or more people in a television program that may be selected by a user. For example and without limitation, such a third party program information provider 120 may comprise a personal website associated with a user-selectable person, a fan club website associated with a user-selectable person, an entertainment magazine, etc.

For example, such third party program information provider 120 may correspond to a commercial enterprise website. Also for example, such third party program information provider 120 may correspond to a central repository for information and/or user interaction for a plurality of such commercial enterprises (e.g., a commercial enterprise, a manufacturer, a supplier, a distributor, a retailer, business, consumer good and/or service rating company, a blog service, a consumer advocacy service, etc.).

The exemplary television system 100 may include one or more communication networks (e.g., the communication network(s) 130). The exemplary communication network 130 may comprise characteristics of any of a variety of types of communication networks over which television programming and/or information related to television programming (e.g., information identifying and/or describing and/or otherwise related to user-selectable objects in television programming) may be communicated. For example and without limitation, the communication network 130 may comprise characteristics of any one or more of: a cable television network, a satellite television network, a telecommunication network, a general data network, the Internet, a local area network (LAN), a personal area network (PAN), a metropolitan area network (MAN), any of a variety of different types of home networks, etc.

The exemplary television system 100 may include a first television 140. Such a first television 140 may, for example, comprise networking capability enabling such television 140 to communicate directly with the communication network 130. For example, the first television 140 may comprise one or more embedded television receivers or transceivers (e.g., a cable television receiver, satellite television transceiver, Internet modem, etc.). Also for example, the first television 140 may comprise one or more recording devices (e.g., for recording and/or playing back video content, television programming, etc.). The first television 140 may, for example, operate to (which includes "operate when enabled to") perform any or all of the functionality discussed herein.

The exemplary television system 100 may include a first television controller 160. Such a first television controller 160 may, for example, operate to (e.g., which includes "operate when enabled to") control operation of the first television 140. The first television controller 160 may comprise characteristics of any of a variety of television controlling devices. For example and without limitation, the first television controller 160 may comprise characteristics of a dedicated television control device, a universal remote control, a cellular telephone or personal computing device with television control capability, any personal electronic device with television control capability, etc. The first television controller 160 may, for example, operate to (which includes "operate when enabled to") perform any or all of the functionality discussed herein. In a non-limiting exemplary configuration, the first television controller 160 may comprise an on-board display which may operate as a television screen (e.g., a primary, secondary and/or parallel television screen) via which the first television controller 160 may present television programming and/or interface with a user regarding user-selectable objects (e.g., objects representative of consumer goods and/or services) in television programming.

The first television controller 160 (or television control device) may, for example, transmit signals directly to the first television 140 to control operation of the first television 140. The first television controller 160 may also, for example, operate to transmit signals (e.g., via the communication network 130) to the television provider 110 to control television programming (or related information) being provided to the first television 140, or to conduct other transactions (e.g., business transactions, etc.).

As will be discussed in more detail later, the first television controller 160 may operate to communicate screen pointing and/or object selection information with the first television 140 and/or other devices. Also, as will be discussed in more detail later, various aspects of the present invention include a user selecting a user-selectable object in programming. Such selection may, for example, be performed by the user pointing to a location on a television screen (e.g., pointing to an animate or inanimate object presented in television programming). In such a scenario, the user may perform such pointing in any of a variety of manners. One of such exemplary manners includes pointing with a television control device. The first television controller 160 provides a non-limiting example of a device that a user may utilize to point to an on-screen location.

As will be mentioned throughout the following discussion, various aspects of the invention will be performed by one or more devices, components and/or modules of a user's local television system. The first television 140 and first television controller 160 provide a non-limiting example of a user's local television system. Such a user's local television system, for example, generally refers to the television-related devices that are local to the television system currently being utilized by the user. For example, when a user is utilizing a television system located at the user's home, the user's local television system generally refers to the television-related devices that make up the user's home television system. Also for example, when a user is utilizing a television system at a premises away from the user's home (e.g., at another home, at a hotel, at an office, etc.), the user's local television system generally refers to the television-related devices that make up the premises television system Such a user's local television system does not, for example, comprise television network infrastructure devices that are generally outside of the user's current premises (e.g., cable and/or satellite head-end apparatus, cable and/or satellite communication intermediate communication network nodes), devices generally associated with commercial enterprises outside of the user's current premises, and/or programming source devices that are generally managed by television enterprises and generally exist outside of the user's home. Such entities, which may be communicatively coupled to the user's local television system, may be considered to be entities remote from the user's local television system (or "remote entities").

The exemplary television system 100 may also include a television receiver 151. The television receiver 151 may, for example, operate to (e.g., which includes "operate when enabled to") provide a communication link between a television and/or television controller and a communication network and/or information provider. For example, the television receiver 151 may operate to provide a communication link between the second television 141 and the communication network 130, or between the second television 141 and the television provider 110 (and/or third party program information provider 120) via the communication network 130.

The television receiver 151 may comprise characteristics of any of a variety of types of television receivers. For example and without limitation, the television receiver 151 may comprise characteristics of a cable television receiver, a satellite television receiver, etc. Also for example, the television receiver 151 may comprise a data communication network modem for data network communications (e.g., with the Internet, a LAN, PAN, MAN, telecommunication network, etc.). The television receiver 151 may also, for example, comprise recording capability (e.g., programming recording and playback, etc.). The television receiver 151 may, for example, be a stand-alone component (e.g., a set top box) or may be integrated with any of a variety of other television system components (e.g., a television, a video recorder, a gaming station, etc.). The television receiver 151 may, for example, operate to (which includes "operate when enabled to") perform any or all of the functionality discussed herein.

The exemplary television system 100 may include a second television controller 161. Such a second television controller 161 may, for example, operate to (e.g., which includes "operate when enabled to") control operation of the second television 141 and the television receiver 151. The second television controller 161 may comprise characteristics of any of a variety of television controlling devices. For example and without limitation, the second television controller 161 may comprise characteristics of a dedicated television control device, a dedicated television receiver control device, a universal remote control, a cellular telephone or personal computing device with television control capability, any personal electronic device with television control capability, etc.

The second television controller 161 may, for example, operate to transmit signals directly to the second television 141 to control operation of the second television 141. The second television controller 161 may, for example, operate to transmit signals directly to the television receiver 151 to control operation of the television receiver 151. The second television controller 161 may additionally, for example, operate to transmit signals (e.g., via the television receiver 151 and the communication network 130) to the television provider 110 to control television programming (or related information) being provided to the television receiver 151, or to conduct other transactions (e.g., business transactions, etc.). The second television controller 161 may further, for example, operate to receive signals from the second television 141 and/or television receiver 151. Such signals may, for example, comprise signals communicating television programming, information identifying and/or describing user-selectable objects in television programming and/or any of a variety of other information to the second television controller 161. As a non-limiting example, the second television controller 161 may comprise an on-board display which may operate as a television (e.g., a primary television, secondary television, parallel television (presenting on the on-board display a same television program as that being presented by the second television 141), etc.). In such a configuration, the second television controller 161 may, for example, operate to perform any or all of the functionality discussed herein.

As will be discussed in more detail later, various aspects of the present invention include a user selecting a user-selectable object (e.g., an object associated with a person, a consumer good and/or service, etc.) in programming. Such selection may, for example, comprise the user pointing to a location on a television screen (e.g., pointing to an animate or inanimate object presented in television programming). In such a scenario, the user may perform such pointing in any of a variety of manners. One of such exemplary manners includes pointing with a television control device. The second television controller 161 provides one non-limiting example of a device that a user may utilize to point to an on-screen location. Also, in a scenario in which the second television controller 161 comprises a touch screen, a user may touch a location of such touch screen to point to an on-screen location (e.g., to select a user-selectable object).

As will be mentioned throughout the following discussion, and as mentioned previously in the discussion of the first television 140 and television controller 160, various aspects of the invention will be performed by one or more devices, components and/or modules of a user's local television system. The second television 141, television receiver 151 and second television controller 161 provide another non-limiting example of a user's local television system.

The exemplary television system 100 was provided to provide a non-limiting illustrative foundation for discussion of various aspects of the present invention. Thus, the scope of various aspects of the present invention should not be limited by any characteristics of the exemplary television system 100 unless explicitly claimed.

Figure 2:
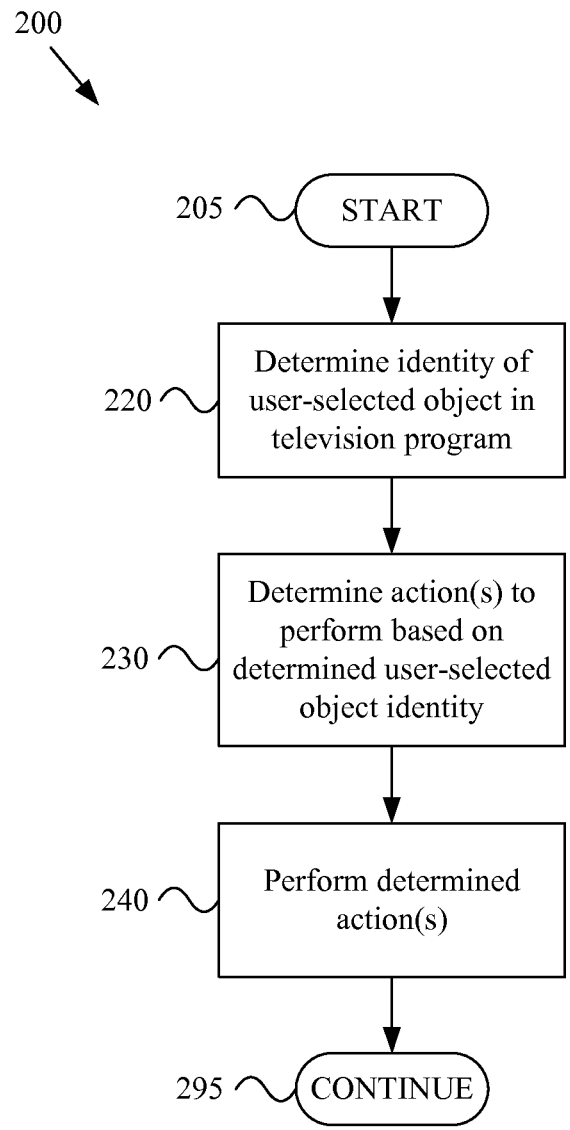
FIG. 2 is a flow diagram illustrating an exemplary method for providing information associated with a user-selected person in a television program, in accordance with various aspects of the present invention.

FIG. 2 is a flow diagram illustrating an exemplary method 200 for providing advertising (or commerce) information associated with a user-selected object in a television program, in accordance with various aspects of the present invention. Any or all aspects of the exemplary method 200 may, for example, be implemented in one or more devices (or components or modules) of a user's local television system (e.g., in any one or more of the first television 140 and/or second television 141, the television receiver 151, the first television controller 160 and/or second television controller 161, etc., shown in FIG. 1 and discussed previously). Also for example, various aspects may also be performed in one or more system entities remote from the user's local television system.

The exemplary method 200 may, for example, begin executing at step 205. The exemplary method 200 may begin executing in response to any of a variety of causes and/or conditions, non-limiting examples of which will now be provided. For example, the exemplary method 200 may begin executing in response to a user command to begin, in response to user selection of a user-selectable object (e.g., an object associated with a person) in a television program, upon television and/or television receiver and/or television controller reset or power-up, in response to a user input indicating a desire to provide object selection capability to the user, in response to identification of a user and/or user equipment for which object selection capability is to be provided, in response to receipt and/or presentation of a television program comprising user-selectable objects, in response to user payment of a fee, etc.

The exemplary method 200 may, for example at step 220, comprise determining an identity of a user-selected object in a television program being presented to a user. Such user-selected object may, for example, correspond to a person in a television program. Step 220 may comprise performing such determining in any of a variety of manners, non-limiting examples of which will now be provided.

For example, step 220 may comprise analyzing various sensor readings to identify an object in television programming selected by a user. For example, step 220 may comprise performing such analysis in a local television system component (or device) implementing the exemplary method 200. Also for example, step 220 may comprise receiving information from another television system component (or device) identifying an object in a television program that has been selected by a user. In such an exemplary scenario, step 220 may, for example, comprise receiving object identification information from another television system component (or device) of the user's local television system and/or from another television system component remote from the user's local television system (e.g., via a direct communication link; via a personal area network, local area network or home area network; via the Internet, etc.).

Many examples of such object-selection determination are provided in U.S. Provisional Patent Application 61/242,234, which is hereby incorporated herein by reference in its entirety. Additionally, examples of such object-selection determination are also provided in: U.S. patent application Ser. No. 12/774,380, filed May 5, 2010, titled "SYSTEM AND METHOD IN A TELEVISION FOR PROVIDING USER SELECTION OF OBJECTS IN A TELEVISION PROGRAM"; U.S. patent application Ser. No. 12/850,832, filed Aug. 5, 2010, titled "SYSTEM AND METHOD IN A DISTRIBUTED SYSTEM FOR PROVIDING USER-SELECTION OF OBJECTS IN A TELEVISION PROGRAM"; U.S. patent application Ser. No. 12/850,866, filed Aug. 5, 2010, titled "SYSTEM AND METHOD IN A TELEVISION RECEIVER FOR PROVIDING USER-SELECTION OF OBJECTS IN A TELEVISION PROGRAM"; U.S. patent application Ser. No. 12/850,911, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/850,945, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/851,036, filed Aug. 5, 2010, titled "SYSTEM AND METHOD IN A TELEVISION SYSTEM FOR PROVIDING FOR USER-SELECTION OF AN OBJECT IN A TELEVISION PROGRAM"; and U.S. patent application Ser. No. 12/851,075, filed Aug. 5, 2010, titled "SYSTEM AND METHOD IN A PARALLEL TELEVISION SYSTEM FOR PROVIDING USER-SELECTION OF OBJECTS IN A TELEVISION PROGRAM". The contents of each of the above-mentioned applications are hereby incorporated herein by reference in their entirety.

A user-selectable object in a television program may be identified by one or more identifiers comprising any of a variety of characteristics. For example, a user-selectable object may be identified by a universally (or globally) unique serial number or name. For example, a user-selectable object may be identified by a data structure that includes a plurality of code fields (e.g., country field, a company or enterprise ID field, a product type field, a product model field, a date/time field, a language field, a personal identifier, etc.). Further for example, in an exemplary scenario where a user-selectable object in a television program corresponds to a person, the user-selectable object (e.g., the person's image and/or screen area associated with the person's image, the person's moving and/or still picture, a graphical image associated with the person, an object belonging to or otherwise associated with the person, for example an award, a garment, a work of authorship, an endorsed product, an employer, a building, a vehicle, a vessel, a park, a venue, etc.) may be identified by the person's name, a globally unique identifier for the person, a combination of name and number, etc.

Also for example, a user-selectable object may be identified, at least in part, by a communication network address at which information about a user-selectable object may be obtained (e.g., a Universal Resource Locator (URL), an Internet address, a memory address, a database identifier, a server identifier and/or address, etc.). For example, a user-selectable object corresponding to a person in a television program may be identified, at least in part, by a URL associated with the person, an IP address associated with the person and/or the person's employer, a URL of an entertainment magazine's database of information about such person, the person's email address, etc.

In general, step 220 may comprise determining an identity of a user-selected object (e.g., a user-selectable object associated with a person) in a television program being presented to a user. Accordingly, the scope of various aspects of the present invention should not be limited by particular characteristics of any particular type of identification and/or of any particular manner of making such a determination unless explicitly claimed.

The exemplary method 200 may, at step 230, comprise determining, based at least in part on the object identity determined at step 220, one or more actions to perform related to a person associated with the identified user-selected object. Step 230 may comprise determining any of a variety of different types of actions and may comprise making such determination in any of a variety of manners, non-limiting examples of which will now be provided.

The determined actions may comprise any of a variety of characteristics, non-limiting examples of which will also be provided. Such actions may, for example, comprise determining information to present to the user (e.g., retrieving such information from a known location at an entity (e.g., a television system component, networked non-television system component, etc.) local to and/or remote from the user's local television system, conducting a search for such information in one or more entities local to and/or remote from the user's local television system, notifying one or more other entities (e.g., a television system component, networked non-television system component, etc.) of the user's selection of the user-selected object (e.g., notifying a television network enterprise, a user-selected person, a commercial enterprise that provide employment for and/or represents a user-selected person, a production enterprise, a distribution enterprise, a rating company, an advertising agency, an entertainment magazine, a media company, a movie studio, etc.), establishing a communication session by which a user may interact with networked entities (e.g., one or more entities remote from the user's local television system) associated with a user-selected object (e.g., communicating regarding general personal information, communicating regarding obtaining a consumer and/or good associated with a user-selected person, communicating regarding membership in an organization related to the user-selected person, etc.), interacting with a user regarding local television system control and/or control of a remote television system component, interacting with a user regarding display of a user-selected object and/or associated information, etc.

For example, step 230 may comprise determining, based at least in part on the determined object identity (or person associated with the identified object), to obtain (or acquire) one or more sets of personal information from a remote system entity (e.g., remote from the user's local television system) and/or from an entity of the user's local television system, where such personal information may then, for example, be presented to the user. Such information obtaining may comprise characteristics of any of a variety of different manners of obtaining such information.

For example, step 230 may comprise determining a memory address of a remote entity associated with the information, and retrieving the information from the determined memory address. For example, such memory address information may be stored in a table or other data structure indexed by object identity (e.g., by general object type or name, by exact object identity, by other objects associated with the identified object, by object representative, etc.). Such a memory may, for example, be part of a user's local television system component (or device) implementing the step 230. Such a memory may also, for example, be a memory of another local television system component that is communicatively coupled to the component implementing step 230 (e.g., a memory accessible by direct memory access, via an information retrieval communication protocol between components, etc.). Such a memory may additionally, for example, be a memory of a system entity that is remote from the user's local television system that is communicatively coupled to the component implementing step 230 (e.g., a memory accessible by direct memory access, via an information retrieval communication protocol between components, etc.).

Also for example, step 230 may comprise determining, based at least in part on the determined object identity, a communication network address (e.g., a network address of a one or more components remote from the user's local television system, a television communication network address, an Internet address, and URL, an email address, etc.). For example, such network address information may be stored in a table or other data structure indexed by object identity (e.g., by general object type or name, by exact object identity, by other objects associated with the identified object, by object representative, etc.). Such a network address may, for example, correspond to a network address at which personal information related to the identified object (or associated person) may be obtained, a network address of a networked entity with which a communication session may be initiated and/or managed (e.g., to obtain information related to a person associated with the user-selected object, to interact with the user regarding a person associated with the selected object, etc.), etc. Note that in an exemplary scenario in which step 230 comprises acquiring information related to a user-selected person in a television program, step 230 may comprise acquiring such information via a communication network that is different from (e.g., at least partially different from, at least partially independent of, completely independent of, etc.) a communication network via which the television program is received.

In an information-determining scenario, the information may comprise any of a variety of different types of information (e.g., personal information) related to a person associated with the user-selected object. For example and without limitation, the determined information may comprise information related the person (e.g., information describing any or all aspects of the person, history of the person, biography of the person, physical characteristics of the person, income of the person, organizations with which the person is associated, information regarding the person's employers, information regarding the person's family life, information regarding projects in which the person has worked, sports statistics of the person, financial data for the person, works of authorship of the person, contact information for the person or associates thereof, award information, educational background, headlines associated with the person, images of the person, videos of the person, audio recordings of the person, information of managers and/or agents associated with the person, charitable organizations with which the person is associated, information of a team with which the person is associated, activities of the person, information of goods and/or services endorsed by the person, critiques of the person and/or the person's activities, information of organizations and/or clubs associated with the person, etc.), information indicating to the user how the user may obtain a consumer good and/or service associated with the selected object (e.g., a consumer good and/or service endorsed by the selected person), etc. In general, step 230 may comprise determining to obtain any of a variety of types of information (e.g., personal information) related to a person associated with the identified user-selected object (e.g., from a system entity local to and/or remote from the user's local television system), where such information may for example, be presented to the user and/or utilized to perform additional actions on behalf of the user.

Step 230 may also, for example, comprise determining to conduct, based at least in part on the determined object identity, a search for information related to the person associated with the identified user-selected object. Such a search may, for example, comprise a search of one or more entities (or system components) remote from the user's local television system (e.g., a search only of such remote entities or a search of such remote entities in addition to one or more components of the user's local television system, home communication network, etc.).

For example, step 230 may comprise determining, based at least in part on the determined object identity (or associated person), network search terms that may be utilized in a search engine to search for information related to a person associated with the user-selected object. For example, such search term information may be stored in a table or other data structure indexed by object (or person) identity (e.g., by general object type or name, by exact object identity, by other objects (including people) associated with the identified object, by object representative, by people and/or commercial enterprises associated with the identified object, etc.).

In another exemplary scenario, step 230 may comprise determining to request information for a person associated with a particular user-selected object or type of user-selected object from a remote entity. For example, step 230 may comprise determining a network address of a remote information server and communicating a request for a particular user-selected object (or associated person) from such information server. In an exemplary scenario comprising a plurality of different information sources (e.g., remote information sources) for respective user-selectable objects (or related people), step 230 may comprise determining to which of the plurality of different information servers the information request should be sent.

As discussed above, one or more actions determined at step 230 may comprise determining to obtain information (e.g., personal information) corresponding to the user-selected object, where such information determining may, for example, comprise accessing such information directly from memory, searching for such information in a variety of manners, etc.

In an exemplary scenario in which such information corresponding to user-selectable objects (or associated person) is stored in one or more television system entities (or other networked entities) remote from the user's local television system, step 230 may comprise determining to initiate an interactive session with the user to more clearly identify information desired by the user. For example, step 230 may comprise determining that, since a relatively large amount of personal information corresponding to a user-selected object (or associated person) in the television program is available, additional interaction with the user is necessary to reduce the amount of information that may ultimately be presented to the user. For example, step 230 may comprise determining to provide a list (or menu) of types of information available to the user (and/or sources of such information) and solicit input from the user regarding the selection of one or more of the listed types (or sources) of information for presentation to the user.

In another exemplary scenario, step 230 may comprise determining to interact with the user to determine a manner in which a determined action is to be performed (and/or whether to perform the determined action). For example, step 230 may comprise determining to interact with the user to select a form of communication with which to communicate with a user-selected person and/or with an associate of the user-selected person and/or with an organization associated with the user-selected person (e.g., email, fax, live chat, instant messaging, telephone call, video phone call, etc.). Also for example, step 230 may comprise providing a user interface by which a user may specify the types of actions allowable when a user-selectable object associated with a person is selected (e.g., provide descriptive information only, establish a communication link only when such communication is approved by the user, only notify an entity of the object selection and provide no user information, pause presentation of the television program during the performance of the determined actions, etc.).

As discussed above, one or more of the actions determined at step 230 may comprise establishing a communication session (e.g., a one-way and/or two-way communication session via the second communication network) by which a user may interact with networked entities (e.g., commercial enterprise systems, agents and/or representatives of a person, employers of a person, etc.) related to a person associated with a user-selected object. For example, such networked entities may comprise components (or devices) remote from the user's local television system. In an exemplary scenario, step 230 may comprise determining to open a user interface session with an object information database (or server) remote from the user's local television system. Such database may, for example, comprise a television system entity, but may also comprise a database independent of a television system (e.g., a server with a general Internet presence, a server on a Local Area Network (LAN) to which the user's local television system has access, etc.).

Such a user interface (e.g., a two-way user interface) may be utilized by the user to interact with networked entities associated with a user-selected person. For example, such a communication interface may be utilized by the user to interact with one or more networked entities remote from the user's local television system to communicate regarding general personal information, communicate regarding the user contacting a user-selected person and/or an associated person or organization, communicating regarding acquiring and/or utilizing a consumer good and/or service endorsed by a user-selected person, communicate regarding membership in an organization and/or service related to a user-selected person, communicate regarding contributing to a charitable cause with which the user-selected person is associated, etc.

In an exemplary scenario, step 230 may comprise determining to manage a two-way Internet chat communication between the user and a person (or entity associated with such person) associated with a user-selected object in a television program. Such chat communication may, for example, utilize a screen of the user's television, television controller, personal computer, etc. In another exemplary scenario, step 230 may comprise determining to manage (e.g., initiate and conduct) a two-way voice communication between the user and a provider of a consumer good and/or service (e.g., a ticket, an article of clothing being worn by a selected person, a consumer good being utilized by a selected person, a type of food being consumed by a selected person, etc.) related to a person that is associated with a user-selected object in a television program (e.g., to conduct a commercial transaction by which the user may obtain such consumer good and/or service). In yet another exemplary scenario, step 230 may comprise determining to manage the communication of an email to a person associated with a user-selected object (e.g., the person's image and/or screen area associated with the person's image, the person's moving and/or still picture, a graphical image associated with the person, an object belonging to or otherwise associated with the person, etc.) in a television program. In still another exemplary scenario, step 230 may comprise determining to execute an Internet web browser and navigate to a web page of a fan club associated with a user-selected person, where the user may access information about the person, about the fan club, information about activities of the person, information about other people related to the person, etc. In yet another exemplary scenario, step 230 may comprise determining to present an on-line order form to the user (e.g., on a display of the user's local television system) and provide a user interface by which the user may complete and submit such on-line order form to purchase a consumer good associated with the user-selected person (e.g., submit such form to a supplier of a consumer good).

Also for example, such a user interface may be utilized to interact with a user regarding local television system control and/or control of a remote television system component. For example, such a user interface may be utilized to provide user control of television program presentation (e.g., user control of remote and/or local television program sources).

Additionally for example, such a user interface may be utilized to interact with a user regarding display of information related to a person associated with a user-selected object (e.g., interacting with a menu structure associated with retrieved and/or available information, interacting with the user regarding screen location for presentation of such information, regarding size of presented information, regarding information scrolling control, regarding duration of information presentation, regarding whether to pause presentation of the television program while such information is being presented to the user, etc.

Also as discussed above, one or more of the actions determined at step 230 may comprise providing a user interface by which a user may control presentation of the user-selected object (e.g., the person's image and/or screen area associated with the person's image, the person's moving and/or still picture, a graphical image associated with the person, an object belonging to or otherwise associated with the person, etc.) to the user. Such an action may, for example, comprise providing a user interface by which the user may pause the television program, center the object on the screen, zoom in and/or out on the object, etc. Such an action may, for example in an exemplary scenario where 3-D object information is available (e.g., stored in a networked entity remote from the user's local television system, stored in a component of the user's local television system, etc.), comprise providing a user interface by which a user may rotate the user-selected object to provide the user with a more complete understanding of the user-selected object. For example, in a scenario in which the user-selected object is representative of a particular person, such functionality would provide the user the capability to view the person (e.g., multiple views and/or images of the person) in any of a variety of manners (e.g., to provide a mechanism by which the user may gain greater familiarity with the person).

In another exemplary scenario, for example a scenario in which commerce information regarding ordering a consumer good associated with the user-selected person is available for the user to consider, such an action may comprise providing a user interface by which the user may explore optional characteristics of the consumer good (e.g., different available coloration, add-ons, delivery options, etc.).

Step 230 may, for example, comprise determining to perform an action comprising notifying an entity remote from the user's local television system of the selection of the user-selected object. For example, step 230 may comprise establishing a communication link with any of a variety of remote entities (e.g., a personal server and/or database belonging to a user-selected person, an agent associated with a user-selected person, an employer of a user-selected person, a team and/or cast associated with a user-selected person, a commercial enterprise associated with the user-selected person, an advertising agency associated with the user selected person, a coach or manager of a user-selected person, a team owner and/or public relations department associated with the user-selected person, a commercial enterprise that produces and/or provides a consumer product and/or service endorsed by the user-selected person, enterprises providing a consumer object and/or service, enterprises advertising a consumer object and/or service, a television program server, a television network operator, etc.).

For example, in a non-limiting exemplary scenario in which a user selects an object in a television program (e.g., the person's image and/or screen area associated with the person's image, the person's moving and/or still picture, a graphical image associated with the person, an object belonging to or otherwise associated with the person, etc.) associated with a person, step 230 may comprise determining to communicate a message to a commercial enterprise associated with such person. In another exemplary scenario in which a user selects an object in a television program associated with a person, a message may be sent to a third party service that tracks user interest in such a person.

In a scenario comprising the communication of information to another entity regarding user-selection of an object in a television program, such information may comprise any of a variety of characteristics. For example, in a first exemplary scenario, step 230 may comprise determining to notify a person, or another person or commercial enterprise related thereto, that an anonymous user has selected a user-selectable object associated with the person. In a second exemplary scenario, step 230 may comprise determining to send information to the recipient about the user (e.g., demographics information, geographical information, location information, general region of location, address information, age, income range information, information of previous purchases from a user and/or user residence, physical characteristics of the user, etc.). For example, in such an information-providing scenario, step 230 may provide such information in accordance with user preferences (e.g., stored in a user profile and/or solicited from the user in real-time).

Note that such communication of object selection information may be performed each time a user-selectable object in television programming is selected, but may also be performed on a periodic basis and/or in response for a request for such information. For example, step 230 may comprise determining to track (e.g., locally) user-selection of objects corresponding to people, for example maintaining a record of such selections. Information of such tracking may then be communicated to a remote system entity (e.g., a television programming provider, one or more respective commercial enterprises associated with the people, one or more advertising agencies associated with the people, a third party dedicated to tracking such person selections, etc. In various scenarios, people and/or commercial enterprises associated with such people may track interest in such people. Also, in various scenarios, people and/or advertising agencies may bill commercial enterprises as a function of the number of times users select television programming objects associated with the people (e.g., when such people are presented with particular consumer goods and/or utilizing various consumer services).

As shown above, various user-selectable objects (or types of objects) that are associated with people may, for example, be associated with any of a variety of respective actions that may be taken (e.g., by one or more components of the user's local television system) upon selection of a respective user-selectable object by a user. Such actions (e.g., information retrieval, information searching, consumer good ordering activity, communication session managing, third party notification, television system control, information presentation control, user interaction control, etc.) may, for example, be included in a table or other data structure. In such a scenario, for example, when a user selects object A (e.g., an moving image of person A) in a television program, step 230 may comprise analyzing a table to determine that object A is associated with presentation of remotely stored personal information of person A to the user and providing the user a mechanism by which the user may view a 3D image of person A at different angles. In another example, when a user selects object B (e.g., a still image of person B) in a television program (e.g., where person B is utilizing customer service B), step 230 may comprise analyzing a table to determine that object B is associated with presentation of an advertisement for service B incorporating person B, the presentation of address information for the nearest provider of consumer service B, and provision of a menu-based interface to the user by which the user may access (e.g., at a remote information server associated with the consumer service) any of a variety of types of information describing various aspects of consumer service B.

In yet another example, when a user selects object C (e.g., an image of a jersey associated with an athlete C) in a sporting event, step 230 may comprise analyzing a data structure to determine that object C is associated with the acquisition (e.g., from a remote server) of game, season and/or lifetime statistical information regarding athlete C, a schedule of upcoming games in which athlete C's team will be playing, a ticket ordering interface for such upcoming games, a product-ordering interface for the user to order sports attire and/or other products associated with athlete C and/or athlete C's team, and presentation of such acquired information and/or user interfaces to the user. In still another example, when a user selects an object D (e.g., an image of reporter D) in a news report, where the object D is associated with a reporter D, step 230 may comprise analyzing a table to determine that object D is associated with presenting a biography of report D to the user, interacting with the user to determine whether the user desires a transcript of the news report and whether the user desires to access a news network database to search for other reports provided by reporter D.

As discussed previously, step 230 may comprise determining one or actions to perform based on general type of a user-selected object (e.g., a member of a group or team) or based on specific identity of a user-selected object (e.g., the specific identity of a person). Step 230 may also comprising determining one or more actions to perform based on the general type of a user-selected object and determining one or more actions to perform based on specific identity (or other more specific identifying characteristics) of a user-selected object. For example, as illustrated above, in a non-limiting exemplary scenario, user-selection of an object associated with a particular person may cause execution of one or more actions generally associated with the person's team (e.g., presenting team standing information and a user interface for ticket ordering, providing a hyperlink to the team's website, etc.), and user-selection of the specific person may cause execution of one or more actions specifically associated with the person (e.g., presentation of personal statistic information, fan club information and/or a user interface by which a user may order the person's jersey).

Note that in all of the examples above, any or all of the information (e.g., commerce information, descriptive information, user interface information, etc.) may reside autonomously in the user's local television system (i.e., in one or more components thereof) and/or may reside in a system entity remote from the user's local television system and communicatively coupled to the user's local television system.

Step 230 may, for example, comprise determining the one or more actions automatically (e.g., without direct user interaction). Also, step 230 may comprise determining the one or more actions by interacting with a user. For example, in an exemplary scenario, step 230 may comprise determining a plurality of optional actions to perform associated with a particular consumer good and/or service. In such a scenario, step 230 may comprise providing a user interface by which the plurality of optional actions may be presented to the user for selection by the user. As with any or all of the user interaction discussed herein, such user interaction may be performed using input and/or output devices of any of the user's local television system components (e.g., television, television receiver, television controller, etc.), of a user's personal computer, etc.

Note that any or all of the above-mentioned actions that involve communication with system entities via a communication network may comprise utilizing any of a variety of communication networks, many examples of which were provided previously. For example, such communication may occur via a television network (e.g., via the same television network over which the television program including the user-selected object is communicated). Also for example, such communication may occur via a different (or different type of) communication network. For example, the television program may be communicated to the user's local television system via a television network, and information of a user-selected person may be communicated via a general data communication network (e.g., the Internet, a LAN, etc.). In yet another example, the television program may be communicated via the Internet, and information associated with a user-selected person may be communicated via a telecommunication network.

In general, step 230 may comprise determining, based at least in part on the object identity determined at step 220, one or more actions to perform related to a person associated with the identified user-selected object. Accordingly, the scope of various aspects of the present invention should not be limited by characteristics of any particular user-selected object, characteristics of any particular person, characteristics of any particular action and/or any particular manner of determining to perform any particular action unless explicitly claimed.

As discussed above, one or more actions determined at step 230 may comprise determining to perform actions, where such actions may comprise accessing information directly, searching for information, directly requesting information, managing a communication session, etc. In such an exemplary scenario, information related to determining one or more actions to perform and/or determining how to perform such one or more determined actions may be stored in one or more components of the user's local television system. Such information (or a remote portion thereof) may also, for example, be stored in a remote entity.

In an exemplary scenario in which such information corresponding to selection and/or performance of actions associated with user-selectable objects (or associated people) is stored in one or more components of the user's local television system (e.g., a television, a television receiver, a television controller, etc.), the method 200 may comprise receiving data associating a user-selectable object (or associated person) in the television program with one or more actions and/or the performance thereof. For example, the method 200 may comprise receiving a data stream (or other data communication format, for example, a file) comprising such information, and storing such information in a memory (or database) of the user's local television system (e.g., before a need arises to access and/or utilize such information).

For example, in such a scenario, such data receiving may comprise receiving such data embedded in a same television program signal that communicates the television program to the user's local television system. Also for example, such data receiving may comprise receiving the data in parallel with receipt of a television program signal that communicates the television program to the user's local television system. Additionally for example, such data receiving may comprise receiving the data in a signal that is independent of a television program signal that communicates the television program to the user's local television system (e.g., receiving such signals from a same source and/or from different respective sources). Further for example, such data receiving may comprise receiving the data in a plurality of different signals from a plurality of different respective sources.

As discussed previously, the received object information may be stored in memory (e.g., of the user's local television system) indexed by object (or person) identification, object (or person) type, television program in which the object appears, scene and/or frame of the television program in which the object appears or to which an object selection window corresponds, etc. Also for example, the received object information may be stored in memory indexed (or otherwise accessible) by search terms.

Turning next to step 240, such step may comprise performing the one or more actions determined at step 230. Step 240 may comprise performing such one or more actions in any of a variety of manners, non-limiting examples of which will be presented below. Step 240 may, for example, comprise performing such one or more actions in respective manners dependent on the respective natures of such one or more actions.

For example, in an exemplary scenario in which a determined action comprises determining (or acquiring) information associated with a user-selected object (or corresponding person), step 240 may comprise performing such information determining. For example, step 240 may comprise acquiring information associated with the user-selected object from a memory (or database) of one or more entities local to and/or remote from the user's local television system.

Also for example, in an exemplary scenario in which a determined action comprises determining (or acquiring) information associated with a user-selected object (or corresponding person), step 240 may comprise determining search terms (or other searching information) and performing such searching. Performing such searching may, for example, comprise searching a storage of a local and/or remote entity for such search terms, querying an entity local to and/or remote from the user's local television system with such search terms, requesting information from a local and/or remote entity concerning a particular user-selected object (or type thereof), etc.

After information is determined, step 240 may, for example, comprise presenting such determined information to the user. Such presenting may, for example, comprise displaying and/or generating a signal that causes the display of the determined information on a screen of the user's local television system (e.g., on a screen of a television, on a screen of a television controller, on a screen of a television receiver and/or another component of the user's local television system, on a screen of a personal computer, etc.). Note that the user may also be provided information via any of a variety of alternative media (e.g., mail, fax, email, instant messaging, telephone, video phone, text messaging, etc.).

Additionally for example, in an exemplary scenario in which a determined action comprises establishing a communication session by which a user may interact with one or more networked entities associated with a user-selected person (e.g., with other components of the user's local television system, with other components of a television system remote from the user's local television system, with other components independent of the television system, etc.), step 240 may comprise establishing and/or managing such communication session(s) utilizing the appropriate communication protocol(s) (e.g., wired and/or wireless network communication protocols).

Further for example, in an exemplary scenario in which a determined action comprises providing a user interface by which the user can control user-selected object information (e.g., information related to a user-selected person) being presented to the user, by which the user can manipulate a view of a selected object, by which a user can interface with one or more components (or devices) of an entity remote from the user's local television system, etc., step 240 may comprise providing such user interface to the user (e.g., by utilizing the various user I/O devices in the user's local television system).

Still further for example, in an exemplary scenario in which a determined action comprises communicating information about user-selection of an object (or associated person) to another entity (e.g., a commercial enterprise or other organization associated with the person), step 240 may comprise performing such communication.

In general, step 240 may comprise performing the one or more actions determined at step 230. Accordingly, the scope of various aspects of the present invention should not be limited by characteristics of any particular type of action nor by characteristics of any particular manner of performing such action unless explicitly claimed.

The exemplary method 200 may, at step 295, comprise performing continued operation. Such continued operation may comprise characteristics of any of a variety of different types of continued operation, non-limiting examples of which will be presented below.

For example, step 295 may comprise looping execution flow of the exemplary method 200 back to step 220 for continued user-selected object determination, action determination and performing. Also for example, step 295 may comprise looping execution flow of the exemplary method 200 back to step 230 for continued action determination and performance regarding a user-selected object (or associated person). Additionally for example, step 295 may comprise performing additional user interaction with the user to further refine the user-selected object actions determined at step 230 and/or performed at step 240. For example, step 295 may comprise interfacing with a user to determine which actions to perform and/or how such actions should be performed. Additionally for example, upon completion of the one or more actions performed at step 240 (e.g., in a scenario in which television program presentation is paused during the performance of such actions) step 295 may comprise resuming normal presentation of the television program.

Also for example, step 295 may comprise determining when the action(s) being performed at step 240 is complete. Step 295 may, for example, comprise making such a determination in any of a variety of manners. For example and without limitation, step 295 may comprise determining that the action performance is complete based, at least in part, on explicit user command indicating that the user no longer desires to interact with the entity local to and/or remote from the user's local television system regarding user-selectable objects (or associated person, consumer goods and/or services, etc.) in television programming. Also for example, step 295 may comprise determining that the action performance is complete based, at least in part, on user dismissal of presented information associated with a user-selected object (e.g., closing an information window and/or other GUI mechanism associated with the user-selected object). Additionally for example, step 295 may comprise determining that the action performance is complete based, at least in part, on a timer (e.g., making such determination a predetermined amount of time after an information and/or a GUI interface is presented to a user, after a user has last interacted with the system regarding a user-selected object, etc.). Further for example, step 295 may comprise determining that the action performance is complete based on a user command to perform some other action (e.g., a user command for normal television program play to resume (if halted), a user command for television program play at fast-forward until caught up to real-time, a user command to jump presentation of the television program to real-time, etc.).

In general, step 295 may comprise performing continued operation. Accordingly, the scope of various aspects of the present invention should not be limited by characteristics of any particular type of continued operation unless explicitly claimed.

The exemplary method 200 may be performed in any one or more components (or devices) of a user's local television system. For example, the method 200 (or a portion thereof) may be performed in a television. Also for example, the method 200 (or a portion thereof) may be performed in a television receiver (e.g., a stand-alone cable and/or satellite television receiver (or set top box), a digital video recorder with television receiver capability, a gaming device with television receiver capability, etc.). Additionally for example, the method 200 (or a portion thereof) may be performed in a television controller (e.g., a dedicated television or entertainment system remote control, a personal electronic device with television control capability, etc.). Further for example, the method 200 may be performed in any combination of the user's local television system components. For example, in a non-limiting exemplary scenario, one or more modules of a television may operate to perform at least step 220, one or more modules of a television controller may operate to perform at least step 230, and one or more modules of a television receiver may operate to perform at least step 240. Additionally, various portions of any of the above-mentioned method steps (e.g., step 220, 230 and 240) may be performed in any one or more components (or devices) remote from the user's local television system.

Additionally, the steps of the exemplary method 200 (or aspects thereof) may, for example, be performed in real-time. In such manner, the user may have relatively expeditious access to functionality associated with the user-selected object. Alternatively for example, the exemplary method 200 (or aspects thereof) may be performed off-line in a manner in which functionality associated with the user-selected object is provided to the user at a later time (e.g., after presentation of the television program, upon the user logging into the user's computer system, upon the user accessing email, etc.).

Further, any or all of the steps of the exemplary method 200 may be performed for user selection of an object in television programming as the programming is broadcast in real-time and/or may be performed for user selection of an object in television programming that has been recorded on a user (or home) television programming recorder (e.g., a personal video recorder (PVR), video cassette recorder (VCR), etc.) and is currently being presented to the user (e.g., at step 220) in a time-shifted manner. For example, a user may record a broadcast television program on a PVR for later viewing, view such recorded programming at a later time, and while viewing such time-shifted television programming at a later time, select user-selectable objects in such programming.

Similarly, any or all of the steps of the exemplary method 200 may be performed for user selection of an object in television programming that has been provided to the user (or stored by the user) on a physical storage medium (e.g., on a digital versatile disc (DVD), video cassette recorder tape, non-volatile memory device, etc.). For example, a user may purchase a set of DVDs including all episodes of a season of a television series, view each of such episodes at the convenience of the user, and while viewing such episodes, select user-selectable objects in such programming. Such DVDs may, for example, comprise any or all of the above-mentioned information (e.g., memory and/or network addressing for entities remote from the user's local television system, general information corresponding to user-selectable objects (or associated people), user interface information corresponding to user-selectable objects, executable software corresponding to user-selectable objects, etc.).

Figure 3:
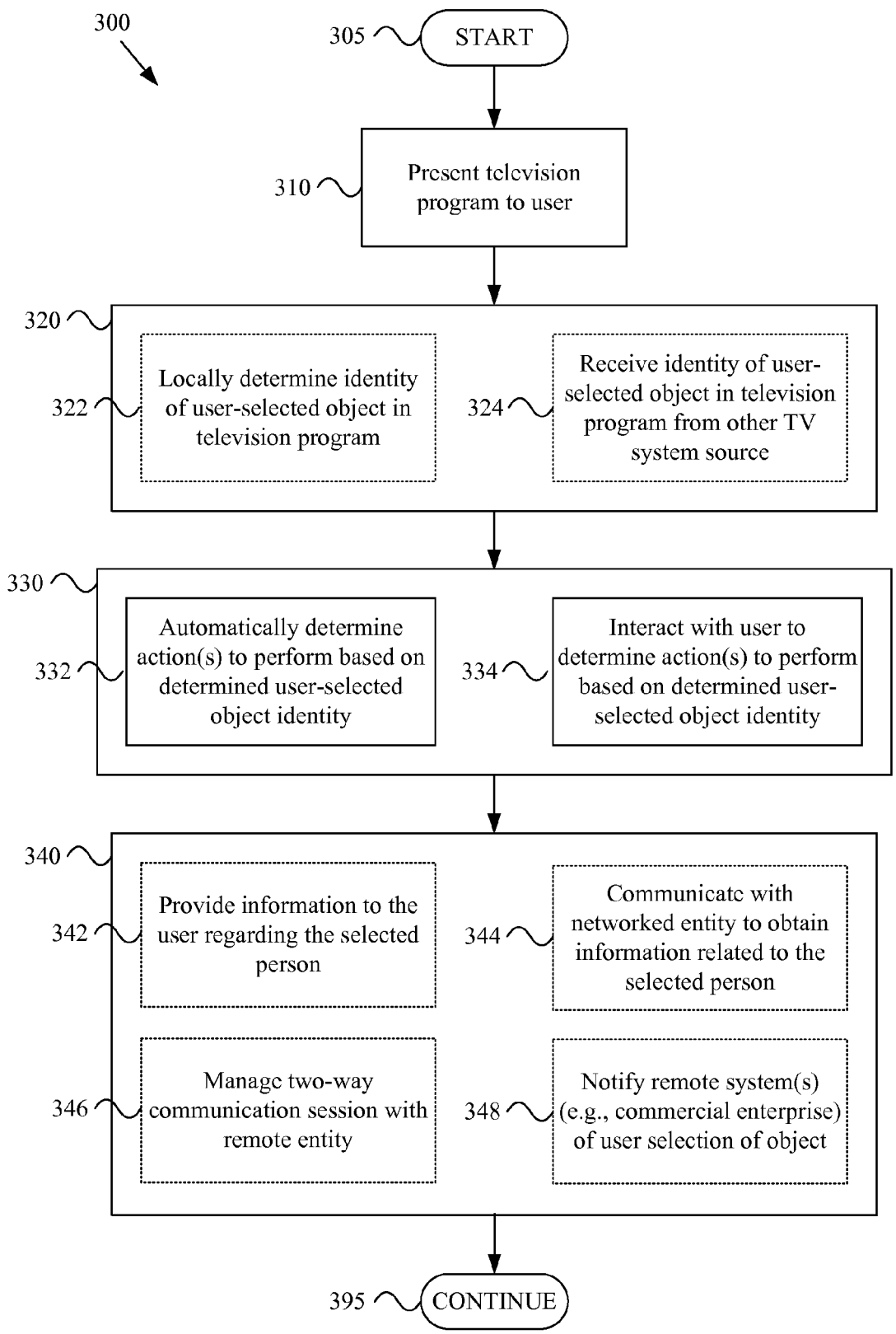
FIG. 3 is a flow diagram illustrating an exemplary method for providing information associated with a user-selected person in a television program, in accordance with various aspects of the present invention.

Turning next to FIG. 3, such figure is a flow diagram illustrating an exemplary method 300 for providing advertising (or commerce) information associated with a user-selected object in a television program, in accordance with various aspects of the present invention. The exemplary method 300 may share any or all characteristics with the exemplary method 200 illustrated in FIG. 2 and discussed previously.

As with the exemplary method 200 discussed above, any or all aspects of the exemplary method 300 may, for example, be implemented in one or more devices of the user's local television system (e.g., any or all or the first television 140 and/or second television 141, the television receiver 151, the first television controller 160 and/or second television controller 161, etc., shown in FIG. 1 and discussed previously). Also, as with the exemplary method 200 discussed above, various aspects may also be performed in one or more system entities remote from the user's local television system.

The exemplary method 300 may, for example, begin executing at step 305. The exemplary method 300 may begin executing in response to any of a variety of causes or conditions. Step 305 may, for example, share any or all characteristics with step 205 of the exemplary method 200 illustrated in FIG. 2 and discussed previously.

The exemplary method 300 may, for example at step 310, comprise presenting a television program to a user, where the program comprises user-selectable objects in the program. Step 310 may comprise presenting such television program to a user in any of a variety of manners, non-limiting examples of which will now be provided.

For example, step 310 may comprise receiving television programming. Many non-limiting examples of such television programming were provided above. Step 310 may comprise receiving the television programming from any of a variety of sources. For example and without limitation, step 310 may comprise receiving the television programming from a television broadcasting company, from a movie streaming company, from a user (or consumer) video recording and/or playback device (e.g., internal and/or external to the television), from an Internet television programming provider, from a gaming device comprising television program capability, from a DVD player, etc.

Step 310 may also comprise receiving the television programming via any of a variety of types of communication networks. Such networks may, for example, comprise a wireless television network (e.g., terrestrial and/or satellite) and/or cable television network. Such networks may, for example, comprise any of variety of general data communication networks (e.g., the Internet, a local area network, a personal area network, a metropolitan area network, etc.).

Step 310 may also, for example, comprise presenting received television programming to a user. Step 310 may, for example, comprise presenting television programming received (e.g., received from a local and/or non-local television program source) to a user in any of a variety of manners. For example, step 310 may comprise presenting the television programming on one or more of a screen of a television, television controller comprising a screen, television receiver comprising a screen, personal computer system, handheld computer, etc.

The presented television programming may, for example, comprise user-selectable objects (e.g., objects associated people) in the television programming. Many non-limiting examples of such user-selectable objects were presented above. In general, such user-selectable objects may, for example, comprise animate and/or inanimate objects in television programming that a user may select (e.g., using a pointing device, touch screen, or other user interface by which a user may identify an object in television programming being presented to the user).

In general, step 310 may comprise presenting a television program to a user, where the program comprises user-selectable objects (e.g., objects associated with a person) in the program. Accordingly, the scope of various aspects of the present invention should not be limited by characteristics of any particular manner of receiving and/or presenting such a television program to a user unless explicitly claimed.

The exemplary method 300 may, at step 320, comprise determining an identity of a user-selected object in a television program being presented to a user. Such user-selected object may, for example, correspond to a person (e.g., the person's image and/or screen area associated with the person's image, the person's moving and/or still picture, a graphical image associated with the person, an object belonging to or otherwise associated with the person, for example an award, a garment, a work of authorship, an endorsed product, an employer, a building, a vehicle, a vessel, a park, a venue, etc.). Step 320 may share any or all characteristics with step 220 of the exemplary method 200 shown in FIG. 2 and discussed previously.

For example and without limitation, step 320 may comprise (e.g., at sub-step 322) locally determining such identity of a user-selected object (e.g., in a component (or device) of the user's local television system, for example, in a television, television receiver, television controller, etc.). Also for example, step 320 may comprise (e.g., at sub-step 324) receiving identity information regarding such a user-selected object from another component (or device) of the user's local television system (e.g., from a component of the user's local television system different from the component implementing step 320) and/or from another television system component (or device) remote from the user's local television system.

The exemplary method 300 may, at step 330, comprise determining, based at least in part on the object identity determined at step 320, one or more actions to perform associated with a consumer good and/or service related to the identified user-selected object. Step 330 may, for example, share any or all characteristics with step 230 of the exemplary method 200 illustrated in FIG. 2 and discussed previously.

Step 330 may, for example at sub-step 332, comprise determining the one or more actions automatically (e.g., without direct user interaction). For example, sub-step 332 may comprise determining one or more actions to perform based on a predetermined action selection profile. Such action selection profile may, for example, comprise manufacturer and/or provider information that is stored in the device implementing sub-step 332 prior to such device being sold to a user. Also for example, such action selection profile may, for example, comprise information provided by the user prior to the need for such information (e.g., prior to step 320 and/or step 310). The action selection profile may, for example, comprise information allowing particular actions (or types of actions) to be performed automatically (i.e., without user interaction), blocking particular actions (or types of actions) from being performed without interacting with the user for permission to perform such actions, and blocking other particular actions (or types of actions) at all times.

Also, step 330 may, for example at sub-step 334, comprise determining the one or more actions by interacting with a user. For example, in an exemplary scenario, sub-step 334 may comprise determining a plurality of optional actions to perform associated with a particular person (e.g., a person associated with a user-selected object identified at step 320). In such a scenario, sub-step 334 may comprise providing a user interface by which the plurality of optional actions may be presented to the user for selection by the user. Also for example, in such a scenario, sub-step 334 may comprise providing a user interface by which a user may specify the manner in which a particular action is to be performed (e.g., manner of acquiring and/or presenting information, types of information to acquire and/or present, characteristics of communication actions, types of information that may be provided about a user, etc.). As with any or all of the user interaction discussed herein, such user interaction may be performed using input and/or output devices of any of the user's local television system components (e.g., television, television receiver, television controller, etc.), of a user's personal computer, etc.

The exemplary method 300 may, at step 340, comprise performing the one or more actions determined at step 330. Step 340 may, for example, share any or all characteristics with step 240 of the exemplary method 200 illustrated in FIG. 2 and discussed previously.

For example and without limitation, step 340 may, for example at sub-step 342, comprise providing information to the user regarding the user-selected object (e.g., regarding the person associated with the user-selected object) identified at step 320. Also for example, step 340 may, for example at sub-step 344, comprise acquiring such information from a local and/or remote source of such information. For example, sub-step 344 may comprise communicating with a networked entity to obtain information regarding a person associated with a user-selected object.

Additionally for example, step 340 may, for example at sub-step 346, comprise managing (e.g., establishing and/or conducting) a communication session by which a user may interact with networked entities (e.g., remote from the user's local television system) associated with a user-selected object (e.g., communicating regarding information associated with a user-selected person and/or organization, general descriptive consumer good and/or service information, communicating regarding obtaining a consumer good and/or service, etc.). Further for example, step 340 may, for example at sub-step 348, comprise notifying one or more other television system entities of the user's selection of the user-selected object (e.g., a production enterprise, a distribution enterprise, a rating company, an advertising agency, etc.). Still further for example, step 340 may comprise interacting with a user regarding local television system control and/or control of a remote television system component, interacting with a user regarding display of a user-selected object and/or associated information, etc.

The exemplary method 300 may, for example at step 395, comprise performing continued operations. Step 395 may, for example, share any or all characteristics with step 295 of the exemplary method 200 illustrated in FIG. 2 and discussed previously.

As discussed previously, any or all portion of the exemplary methods 200 and 300 may be implemented in one or more components (or devices) of a user's local television system. Various non-limiting examples of such implementation will now be presented in the discussion of FIGS. 4-7. Note that, as discussed previously, at least portions of the previously-discussed steps may also be performed in components remote from the user's local television system. Accordingly, the scope of various aspects of the present invention should not be limited by the following focus on various entities of the user's local television system unless explicitly claimed.

Figure 4:
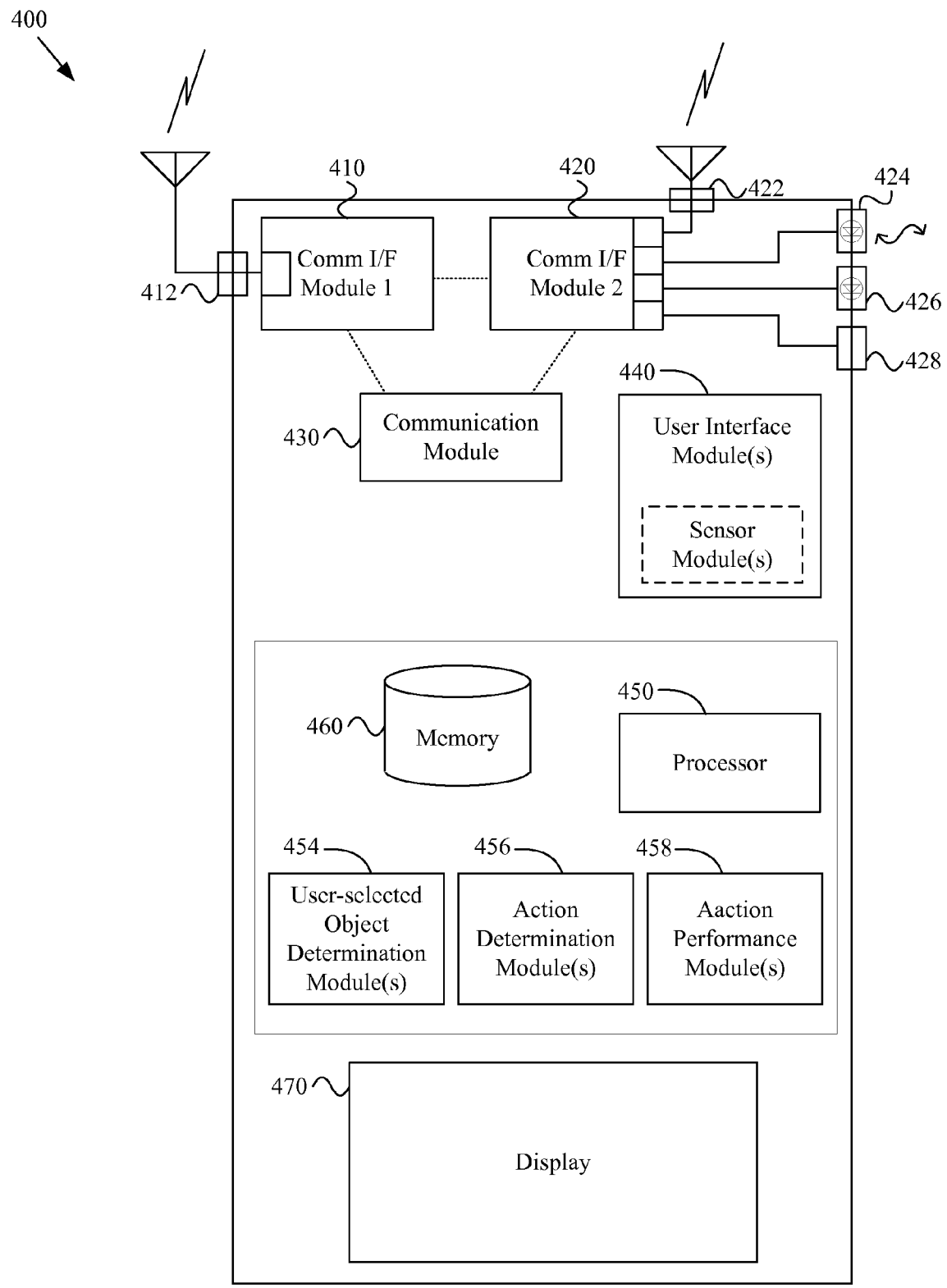
FIG. 4 is a diagram illustrating an exemplary television, in accordance with various aspects of the present invention.

Turning next to FIG. 4, such figure is a diagram illustrating an exemplary television 400, in accordance with various aspects of the present invention. The exemplary television 400 may, for example, share any or all characteristics with one or more of the exemplary televisions 140 and 141 illustrated in FIG. 1 and discussed previously. Also, the exemplary television 400 (e.g., various modules thereof) may operate to perform any or all of the functionality discussed previously with regard to the exemplary methods 200 and 300 illustrated in FIGS. 2-3 and discussed previously.

The exemplary television 400 includes a first communication interface module 410. The first communication interface module 410 may, for example, operate to communicate over any of a variety of communication media and utilizing any of a variety of communication protocols. For example, though the first communication interface module 410 is illustrated coupled to a wireless RF antenna via a wireless port 412, the wireless medium is merely illustrative and non-limiting. The first communication interface module 410 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data (e.g., information related to a person, commerce information, etc.) is communicated. Also for example, the first communication interface module 410 may operate to communicate with local sources of television video content (e.g., video recorders, receivers, gaming devices, etc.). Additionally, for example, the first communication interface module 410 may operate to communicate with a television controller and/or a television receiver external to the television 400 (e.g., directly or via one or more intermediate communication networks).

The exemplary television 400 includes a second communication interface module 420. The second communication interface module 420 may, for example, operate to communicate over any of a variety of communication media and utilizing any of a variety of communication protocols. For example, the second communication interface module 420 may communicate via a wireless RF communication port 422 and antenna, or may communicate via a non-tethered optical communication port 424 (e.g., utilizing laser diodes, photodiodes, etc.). Also for example, the second communication interface module 420 may communicate via a tethered optical communication port 426 (e.g., utilizing a fiber optic cable), or may communicate via a wired communication port 428 (e.g., utilizing coaxial cable, twisted pair, HDMI cable, Ethernet cable, any of a variety of wired component and/or composite video connections, etc.). The second communication interface module 420 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication module 420 may operate to communicate with local sources of television video content (e.g., video recorders, receivers, gaming devices, etc.). Additionally, for example, the second communication module 420 may operate to communicate with a television controller (e.g., directly or via one or more intervening communication networks).

The exemplary television 400 may also comprise additional communication interface modules, which are not illustrated. Such additional communication interface modules may, for example, share any or all aspects with the first 410 and second 420 communication interface modules discussed above.

The exemplary television 400 may also comprise a communication module 430. The communication module 430 may, for example, operate to control and/or coordinate operation of the first communication interface module 410 and the second communication interface module 420 (and/or additional communication interface modules as needed). The communication module 430 may, for example, provide a convenient communication interface by which other components of the television 400 may utilize the first 410 and second 420 communication interface modules. Additionally, for example, in an exemplary scenario where a plurality of communication interface modules are sharing a medium and/or network, the communication module 430 may coordinate communications to reduce collisions and/or other interference between the communication interface modules.

The exemplary television 400 may additionally comprise one or more user interface modules 440. The user interface module(s) 440 may generally operate to provide user interface functionality to a user of the television 400. For example, and without limitation, the user interface module(s) 440 may operate to provide for user control of any or all standard television commands (e.g., channel control, volume control, on/off, screen settings, input selection, etc.). The user interface module(s) 440 may, for example, operate and/or respond to user commands utilizing user interface features disposed on the television (e.g., buttons, etc.) and may also utilize the communication module 430 (and/or first 410 and second 420 communication interface modules) to communicate with a television controller (e.g., a dedicated television remote control, a universal remote control, a cellular telephone, personal computing device, gaming controller, etc.).

The user interface module(s) 440 may also comprise one or more sensor modules that operate to interface with and/or control operation of any of a variety of sensors that may be utilized to ascertain an on-screen pointing location. For example and without limitation, the user interface module 440 (or sensor module(s) thereof) may operate to receive signals associated with respective sensors (e.g., raw or processed signals directly from the sensors, through intermediate devices, via the communication interface modules 410, 420, etc.). Also for example, in scenarios in which such sensors are active sensors (as opposed to purely passive sensors), the user interface module(s) 440 (or sensor module(s) thereof) may operate to control the transmission of signals (e.g., RF signals, optical signals, acoustic signals, etc.) from such sensors. Additionally, the user interface module(s) 440 may perform any of a variety of video output functions (e.g., presenting television programming to a user, providing visual feedback to a user regarding an identified user-selected object in the presented television programming, etc.).

The exemplary television 400 may comprise one or more processors 450. The processor(s) 450 may, for example, comprise a general purpose processor, digital signal processor, application-specific processor, microcontroller, microprocessor, etc. For example, the processor 450 may operate in accordance with software (or firmware) instructions. As mentioned previously, any or all functionality discussed herein may be performed (in-part or in-whole) by a processor executing instructions. For example, though various modules are illustrated as separate blocks or modules in FIG. 4, such illustrative modules, or a portion thereof, may be implemented by the processor 450.

The exemplary television 400 may comprise one or more memories 460. As discussed above, various aspects may be performed by one or more processors executing instructions. Such instructions may, for example, be stored in the one or more memories 460. Such memory 460 may, for example, comprise characteristics of any of a variety of types of memory. For example and without limitation, such memory 460 may comprise one or more memory chips (e.g., ROM, RAM, EPROM, EEPROM, flash memory, one-time-programmable OTP memory, etc.), hard drive memory, CD memory, DVD memory, etc.

Also as discussed previously, various information corresponding to user-selectable objects (e.g., objects associated with people) in television programming (e.g., descriptive information describing people, communication information, information regarding obtaining consumer goods and/or services, user interaction information, user control information, information describing interactions with local and/or remote devices and associated with user-selectable objects and related people, information related to user acquisition of consumer goods and/or services, etc.) may be stored in memory. The memory 460 provides one non-limiting example of a memory in which such information may be stored. Note that such memory 460 (or a portion thereof) may also be external to the television 400 and communicatively coupled thereto.

The exemplary television 400 may comprise one or more modules (not explicitly illustrated in FIG. 4) that operate to receive and present a television program to a user. Such one or more modules may, for example, operate to utilize one or more of the user interface module(s) 440 to present the television program on the display 470. The one or more modules may, for example, operate to perform step 310 of the exemplary method 300 discussed previously.

The exemplary television 400 may comprise one or more user-selected object determination modules 454 that operate to determine an identity of a user-selected object (or an associated person, consumer good and/or service, commercial enterprise, etc.) in a television program being presented to a user. For example, such module(s) 454 may operate to perform step 220 of the exemplary method 200 discussed previously and/or step 320 of the exemplary method 300 discussed previously.

For example, in an exemplary scenario in which the television 400 locally determines an identify of a user-selected object, the module(s) 454 may operate to utilize one or more of the user interface module(s) 440 to interface with various sensors. Additionally, for example, the module(s) 454 may operate to utilize the communication module 430 (and communication interface modules 410 and 420) to communicate with external systems regarding various sensor signals.

Also for example, in another exemplary scenario in which the television 400 operates to receive information of the identity of a user-selected object in a television program from a source external to the television 400, the module(s) 454 may operate to utilize the communication module 430 (and communication interface modules 410 and 420) to communicate with such external source.

The exemplary television 400 may also, for example, comprise one or more action determination module(s) 456 that operate to determine (e.g., based at least in part on the determined identity of a user-selected object (or associated person) in a television program) one or more actions in which to engage with an entity local to and/or remote from the user's local television system. For example, such module(s) 456 may operate to perform step 230 of the exemplary method 200 discussed previously and/or step 330 of the exemplary method 300 discussed previously.

For example, in a non-limiting exemplary scenario in which such action determination comprises analyzing a table or other data structure correlating object identification characteristics (or person identification characteristics) to particular actions, the module(s) 456 may operate to analyze such a table and/or other data structure stored in the memory 460. Additionally for example, in an exemplary scenario in which such action determination comprises interacting with the user to determine an initial action and/or subsequent action related to the identified user-selected object (or associated person or people), the module(s) 456 may operate to utilize the user interface module(s) 440 to perform such user interaction.

The exemplary television 400 may additionally comprise one or more action performance modules 458 that operate to perform the one or more actions determined by the action determination module(s) 456. For example, the action performance module(s) 458 may operate to perform step 240 of the exemplary method 200 discussed previously and/or step 340 of the exemplary method 300 discussed previously.

For example, in a non-limiting exemplary scenario in which a determined action comprises retrieving information associated with an object (or related person) from a memory of an entity remote from the user's local television system (e.g., a memory of a networked entity associated with a particular person, a memory of a networked entity of a commercial enterprise related to a particular person, etc.), the module(s) 458 may operate to communicate with such memory (e.g., either directly, for example, utilizing DMA and/or indirectly utilizing an interface of the remote entity) of the remote entity. For example, the module(s) 458 may operate to utilize the communication module 430 (and first communication interface module 410 and/or second communication interface module 420) to communicate with such remote entity. Such a remote entity may, for example, comprise a communication infrastructure component of a television system, a television server component, a cable and/or satellite head-end station, a networked information server, a remote computer communicatively coupled to the television, a web-server or database of a commercial enterprise, etc.

Also for example, in a non-limiting scenario in which a determined action comprises searching for information, the module(s) 458 may operate to perform a search for such information. In such a scenario, the module(s) 458 may, for example, operate to perform such a search in memory of other television system components and/or other networked entities (e.g., web-servers or databases of commercial enterprises) that are remote from the user's local television system (e.g., directly utilizing direct memory access and/or utilizing a search interface provided by a remote entity). For example, the module(s) 458 may operate to perform such a search in such remote entities utilizing the communication module 430 (and first communication interface module 410 and/or second communication interface module 420) to communicate with such remote entities. For example, such remote entities may provide an interface specifically adapted to request and/or search for information stored in and/or accessible to such remote entities. In such a scenario, the module(s) 458 may operate in accordance with such interface.

In an exemplary scenario, a remote entity may operate in accordance with a protocol in which a requestor requests (via a communication network) information associated with a particular user-selected object (or associated person), and the remote entity responds to such a request by communicating the requested information back to the requestor. In such a scenario, the module(s) 458 would operate in accordance with such protocol when interacting with the remote entity via the communication network.

Additionally for example, in a non-limiting scenario in which a determined action comprises interfacing with a user of the television 400, the module(s) 458 may operate to utilize the user interface module(s) 440 to provide the user interface.

For example, in an exemplary scenario in which a determined action comprises presenting object information (e.g., information of a person) and/or different views of the object to a user, the module(s) 458 may operate to utilize the user interface module(s) 440 to perform such output (e.g., on the display 470 of the television 400). Also for example, the module(s) 458 may operate to utilize the communication module 430 (and first communication interface module 410 and/or second communication interface module 420) to communicate with one or more other local television system components to provide such information to such one or more other local television system components for presentation on respective output displays of such one or more other local television system components.

Further for example, in a non-limiting scenario in which a determined action comprises establishing and/or managing a communication session between the user and another system entity (e.g., a television system and/or non-television system entity remote from the user's local television system), the module(s) 458 may operate to utilize the user interface module(s) 440 to provide the user interface and utilize the communication module(s) 430 (and first communication interface module 410 and/or second communication interface module 420) to communicate to perform communication link establishment and/or management.

Still further for example, in a non-limiting scenario in which a determined action comprises notifying one or more other television system and/or other networked entities of the user's selection of the user-selected object (e.g., a networked entity associated with a person, a networked entity associated with an organization that is associated with a person, a production enterprise, a distribution enterprise, a rating company, an advertising agency, etc.), the module(s) 458 may operate to utilize the communication module(s) 430 (and first communication interface module 410 and/or second communication interface module 420) to perform such notification.

Though not illustrated, the exemplary television 400 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 454, 456 and 458) may be performed by the processor(s) 450 executing instructions stored in the memory 460.

Figure 5:
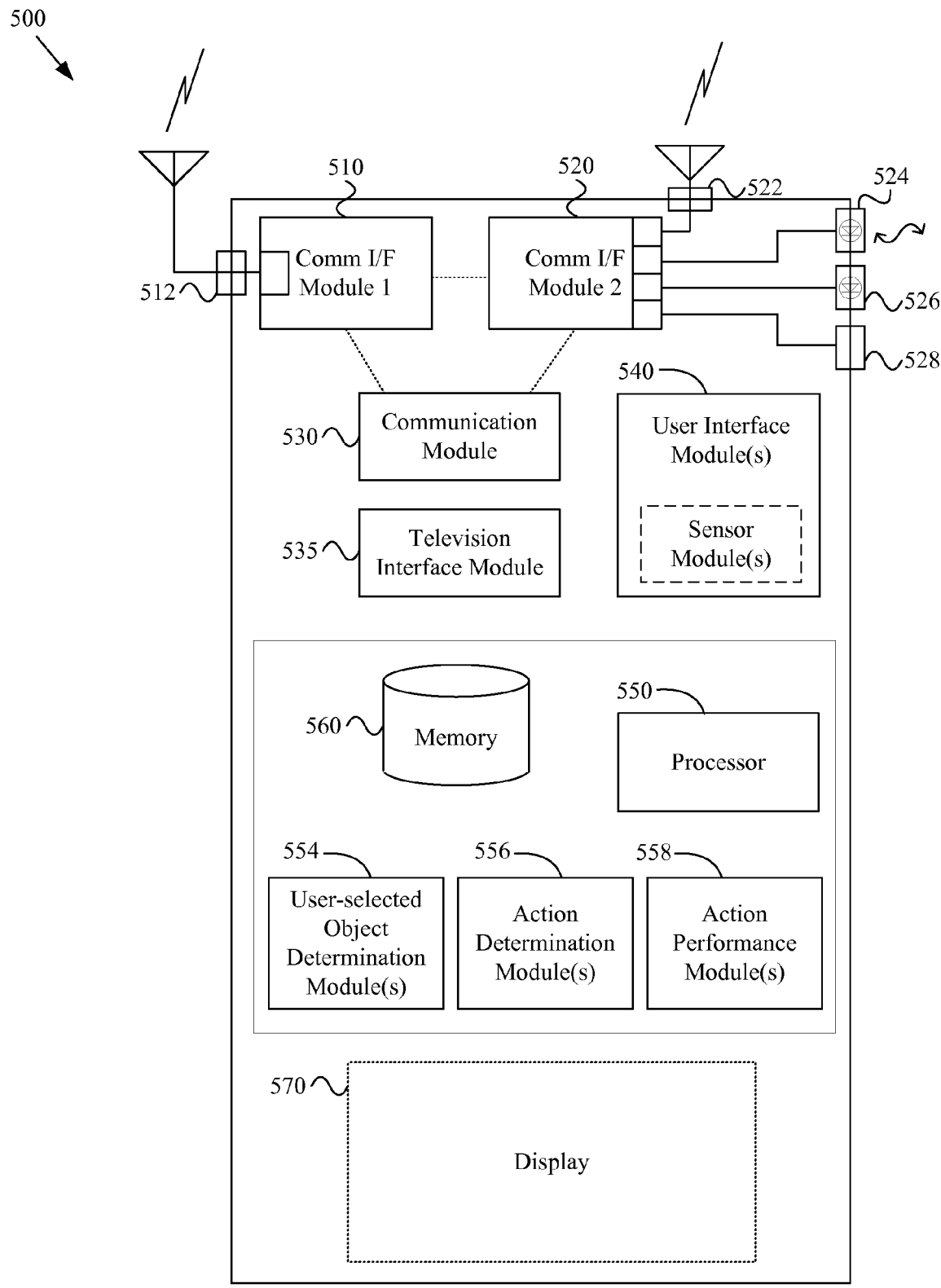
FIG. 5 is a diagram illustrating an exemplary television receiver, in accordance with various aspects of the present invention.

Turning next to FIG. 5, such figure is a diagram illustrating an exemplary television receiver 500, in accordance with various aspects of the present invention. The exemplary television receiver 500 may, for example, share any or all characteristics with the exemplary television receiver 151 illustrated in FIG. 1 and discussed previously. Also, the exemplary television receiver 500 may, for example, share any or all characteristics with the exemplary television 400 illustrated in FIG. 4 and discussed previously. For example, the exemplary television receiver 500 (e.g., various modules thereof) may operate to perform any or all of the functionality discussed previously with regard to the exemplary methods 200 and 300 illustrated in FIGS. 2-3 and discussed previously.

The exemplary television receiver 500 includes a first communication interface module 510. The first communication interface module 510 may, for example, operate to communicate over any of a variety of communication media and utilizing any of a variety of communication protocols. For example, though the first communication interface module 510 is illustrated coupled to a wireless RF antenna via a wireless port 512, the wireless medium is merely illustrative and non-limiting. The first communication interface module 510 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data (e.g., information related to a person, commerce information, etc.) is communicated. Also for example, the first communication interface module 510 may operate to communicate with local sources of television video content (e.g., video recorders, receivers, gaming devices, etc.). Additionally, for example, the first communication interface module 510 may operate to communicate with a television controller and/or a television (e.g., directly or via one or more intermediate communication networks).

The exemplary television receiver 500 includes a second communication interface module 520. The second communication interface module 520 may, for example, operate to communicate over any of a variety of communication media and utilizing any of a variety of communication protocols. For example, the second communication interface module 520 may communicate via a wireless RF communication port 522 and antenna, or may communicate via a non-tethered optical communication port 524 (e.g., utilizing laser diodes, photodiodes, etc.). Also for example, the second communication interface module 520 may communicate via a tethered optical communication port 526 (e.g., utilizing a fiber optic cable), or may communicate via a wired communication port 528 (e.g., utilizing coaxial cable, twisted pair, HDMI cable, Ethernet cable, any of a variety of wired component and/or composite video connections, etc.). The second communication interface module 520 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication module 520 may operate to communicate with local sources of television video content (e.g., video recorders, receivers, gaming devices, etc.). Additionally, for example, the second communication module 520 may operate to communicate with a television controller and/or a television external to the television receiver 500 (e.g., directly or via one or more intervening communication networks). The second communication interface module 520 may, for example, operate to communicate video and/or graphics information to a television and/or television receiver (e.g., using any of the previous interfaces mentioned above).

The exemplary television receiver 500 may also comprise additional communication interface modules, which are not illustrated. Such additional communication interface modules may, for example, share any or all aspects with the first 510 and second 520 communication interface modules discussed above.

The exemplary television receiver 500 may also comprise a communication module 530. The communication module 530 may, for example, operate to control and/or coordinate operation of the first communication interface module 510 and the second communication interface module 520 (and/or additional communication interface modules as needed). The communication module 530 may, for example, provide a convenient communication interface by which other components of the television receiver 500 may utilize the first 510 and second 520 communication interface modules. Additionally, for example, in an exemplary scenario where a plurality of communication interface modules are sharing a medium and/or network, the communication module 530 may coordinate communications to reduce collisions and/or other interference between the communication interface modules.

The exemplary television receiver 500 may also comprise one or more television interface modules 535 that operate to provide an interface between the television receiver 500 and a television (e.g., a television external to the television receiver 500 or housed with the television receiver). For example, the television interface module(s) 535 may operate to provide video, graphical and/or textual information to a television (e.g., via the communication module 530, first communication interface module(s) 510 and/or second communication interface module(s) 520).

The exemplary television receiver 500 may additionally comprise one or more user interface modules 540. The user interface module(s) 540 may generally operate to provide user interface functionality to a user of the television receiver 500. For example, and without limitation, the user interface module(s) 540 may operate to provide for user control of any or all standard television commands (e.g., channel control, volume control, on/off, screen settings, input selection, etc.). The user interface module(s) 540 may, for example, operate and/or respond to user commands utilizing user interface features disposed on the television receiver 500 (e.g., buttons, etc.) and may also utilize the communication module 530 (and/or first 510 and second 520 communication interface modules) to communicate with a television controller (e.g., a dedicated television remote control, a universal remote control, a cellular telephone, personal computing device, gaming controller, etc.).

The user interface module(s) 540 may also comprise one or more sensor modules that operate to interface with and/or control operation of any of a variety of sensors that may be utilized to ascertain an on-screen pointing location. For example and without limitation, the user interface module 540 (or sensor module(s) thereof) may operate to receive signals associated with respective sensors (e.g., raw or processed signals directly from the sensors, through intermediate devices, via the communication interface modules 510, 520, etc.). Also for example, in scenarios in which such sensors are active sensors (as opposed to purely passive sensors), the user interface module(s) 540 (or sensor module(s) thereof) may operate to control the transmission of signals (e.g., RF signals, optical signals, acoustic signals, etc.) from such sensors. Additionally, the user interface module(s) 540 may perform any of a variety of video output functions (e.g., presenting television programming to a user, providing visual feedback to a user regarding an identified user-selected object in the presented television programming, etc.).

The exemplary television receiver 500 may comprise one or more processors 550. The processor(s) 550 may, for example, comprise a general purpose processor, digital signal processor, application-specific processor, microcontroller, microprocessor, etc. For example, the processor 550 may operate in accordance with software (or firmware) instructions. As mentioned previously, any or all functionality discussed herein may be performed by a processor executing instructions. For example, though various modules are illustrated as separate blocks or modules in FIG. 5, such illustrative modules, or a portion thereof, may be implemented by the processor 550.

The exemplary television receiver 500 may comprise one or more memories 560. As discussed above, various aspects may be performed by one or more processors executing instructions. Such instructions may, for example, be stored in the one or more memories 560. Such memory 560 may, for example, comprise characteristics of any of a variety of types of memory. For example and without limitation, such memory 560 may comprise one or more memory chips (e.g., ROM, RAM, EPROM, EEPROM, flash memory, one-time-programmable OTP memory, etc.), hard drive memory, CD memory, DVD memory, etc.

Also as discussed previously, various information corresponding to user-selectable objects (e.g., objects associated with people) in television programming (e.g., descriptive information describing people, communication information, information regarding obtaining consumer goods and/or services, user interaction information, user control information, information describing interactions with local and/or remote entities and associated with user-selectable objects and related people, information related to the acquisition of consumer goods and/or services, etc.) may be stored in memory. The memory 560 provides one non-limiting example of a memory in which such information may be stored. Note that such memory 560 (or a portion thereof) may also be external to the television 500 and communicatively coupled thereto.

The exemplary television receiver 500 may comprise one or more modules (not explicitly illustrated in FIG. 5) that operate to receive and present a television program to a user. Such one or more modules may, for example, operate to utilize one or more of the user interface module(s) 540 to present the television program on the optional display 570 of the receiver 500 (if such display is present) and/or a display external to and communicatively coupled to the receiver 500. The one or more modules may, for example, operate to perform step 310 of the exemplary method 300 discussed previously.

The exemplary television receiver 500 may comprise one or more user-selected object determination modules 554 that operate to determine an identity of a user-selected object (or an associated person, consumer good and/or service, commercial enterprise, etc.) in a television program being presented to a user. For example, such module(s) 554 may operate to perform step 220 of the exemplary method 200 discussed previously and/or step 320 of the exemplary method 300 discussed previously.

For example, in an exemplary scenario in which the television receiver 500 locally determines an identify of a user-selected object, the module(s) 554 may operate to utilize one or more of the user interface module(s) 540 to interface with various sensors. Additionally, for example, the module(s) 554 may operate to utilize the communication module 530 (and communication interface modules 510 and 520) to communicate with external systems regarding various sensor signals.

Also for example, in another exemplary scenario in which the television receiver 500 operates to receive information of the identity of a user-selected object in a television program from a source external to the television receiver 500, the module(s) 554 may operate to utilize the communication module 530 (and communication interface modules 510 and 520) to communicate with such external source.

The exemplary television receiver 500 may also, for example, comprise one or more action determination module(s) 556 that operate to determine (e.g., based at least in part on the determined identity of a user-selected object (or associated person) in a television program, one or more actions in which to engage with an entity local to and/or remote from the user's local television system. For example, such module(s) 556 may operate to perform step 230 of the exemplary method 200 discussed previously and/or step 330 of the exemplary method 300 discussed previously.

For example, in a non-limiting exemplary scenario in which such action determination comprises analyzing a table or other data structure correlating object identification characteristics (or person identification characteristics) to particular actions, the module(s) 556 may operate to analyze such a table and/or other data structure stored in the memory 560. Additionally for example, in an exemplary scenario in which such action determination comprises interacting with the user to determine an initial action and/or subsequent action related to the identified user-selected object (or associated person or people), the module(s) 556 may operate to utilize the user interface module(s) 540 to perform such user interaction.

The exemplary television receiver 500 may additionally comprise one or more action performance modules 558 that operate to perform the one or more actions determined by the action determination module(s) 556. For example, the action performance module(s) 558 may operate to perform step 240 of the exemplary method 200 discussed previously and/or step 340 of the exemplary method 300 discussed previously.

For example, in a non-limiting exemplary scenario in which a determined interaction comprises retrieving information associated with an object (or related person) from a memory of an entity remote from the user's local television system (e.g., a memory of a networked entity associated with a particular person, a memory of a networked entity of a commercial enterprise related to a particular person, etc.), the module(s) 558 may operate to communicate with such memory of the remote entity (e.g., either directly, for example, utilizing DMA and/or indirectly utilizing an interface of the remote entity). For example, the module(s) 558 may operate to utilize the communication module 530 (and first communication interface module 510 and/or second communication interface module 520) to communicate with such remote entity. Such a remote entity may, for example, comprise a communication infrastructure component of a television system, a television server component, a cable and/or satellite head-end station, a networked information server, a remote computer communicatively coupled to the television, a web-server or database of a commercial enterprise, etc.

Also for example, in a non-limiting scenario in which a determined action comprises searching for information, the module(s) 558 may operate to perform a search for such information. In such a scenario, the module(s) 558 may, for example, operate to perform such a search in memory of other television system components and/or other networked entities (e.g., web-servers or databases of commercial enterprises) that are remote from the user's local television system (e.g., directly utilizing direct memory access and/or utilizing a search interface provided by a remote entity). For example, the module(s) 558 may operate to perform such a search in such remote entities utilizing the communication module 530 (and first communication interface module 510 and/or second communication interface module 520) to communicate with such remote entities. For example, such remote entities may provide an interface specifically adapted to request and/or search for information stored in and/or accessible to such remote entities. In such a scenario, the module(s) 558 may operate in accordance with such interface.

In an exemplary scenario, a remote entity may operate in accordance with a protocol in which a requestor requests (via a communication network) information associated with a particular user-selected object (or associated person), and the remote entity responds to such a request by communicating the requested information back to the requestor. In such a scenario, the module(s) 558 would operate in accordance with such protocol when interacting with the remote entity via the communication network.

Additionally for example, in a non-limiting scenario in which a determined action comprises interfacing with a user of the television receiver 500, the module(s) 558 may operate to utilize the user interface module(s) 540 to provide the user interface.

For example, in an exemplary scenario in which a determined action comprises presenting object information (e.g., information of a person) and/or different views of the object to a user, the module(s) 558 may operate to utilize the user interface module(s) 540 to perform such output (e.g., on the optional display 570 of the television receiver 500 if such a display 570 is included). Also for example, the module(s) 558 may operate to utilize the communication module 530 (and first communication interface module 510 and/or second communication interface module 520) to communicate with one or more other local television system components (e.g., a television, television controller, personal computing device or system, etc. coupled to the television receiver 500) to provide such information to such one or more other local television system components for presentation on respective output displays of such one or more other local television system components.

Further for example, in a non-limiting scenario in which a determined action comprises establishing and/or managing a communication session between the user and another system entity, the module(s) 558 may operate to utilize the user interface module(s) 540 to provide the user interface and utilize the communication module(s) 530 (and first communication interface module 510 and/or second communication interface module 520) to communicate to perform communication link establishment and/or management.

Still further for example, in a non-limiting scenario in which a determined action comprises notifying one or more other television system and/or other networked entities of the user's selection of the user-selected object (e.g., a networked entity associated with a person, a networked entity associated with an organization that is associated with a person, a production enterprise, a distribution enterprise, a rating company, an advertising agency, etc.), the module(s) 558 may operate to utilize the communication module(s) 530 (and first communication interface module 510 and/or second communication interface module 520) to perform such notification.

Though not illustrated, the exemplary television receiver 500 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 554, 556 and 558) may be performed by the processor(s) 550 executing instructions stored in the memory 560.

Figure 6:
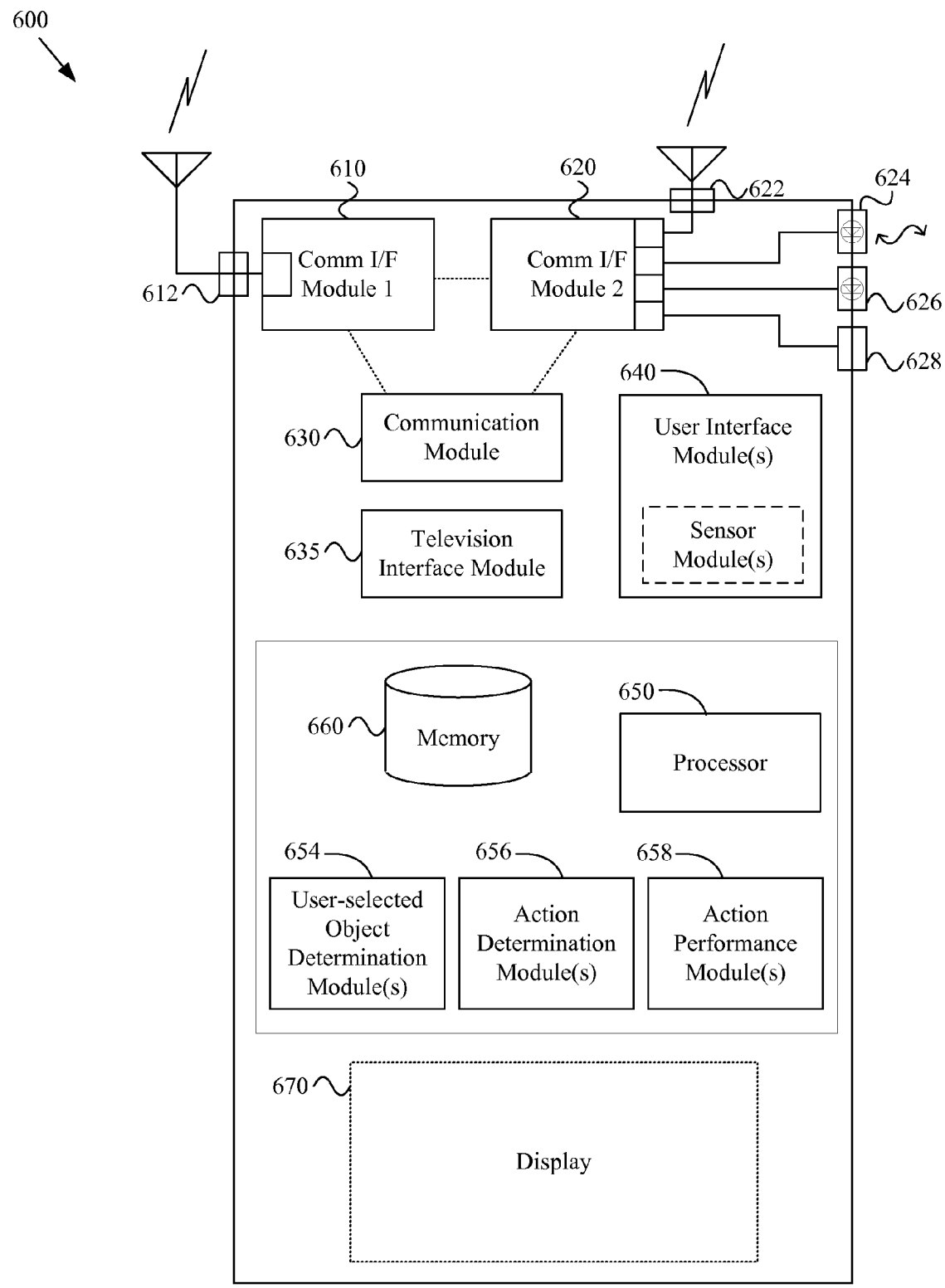
FIG. 6 is a diagram illustrating an exemplary television controller, in accordance with various aspects of the present invention.

Turning next to FIG. 6, such figure is a diagram illustrating an exemplary television controller 600, in accordance with various aspects of the present invention. The exemplary television controller 600 may, for example, share any or all characteristics with the exemplary television controllers 160 and 161 illustrated in FIG. 1 and discussed previously. Also, the exemplary television controller 600 may, for example, share any or all characteristics with the exemplary television 400 illustrated in FIG. 4 and discussed previously and/or with the exemplary television receiver 500 illustrated in FIG. 5 and discussed previously. For example, the exemplary television controller 600 (e.g., various modules thereof) may operate to perform any or all of the functionality discussed previously with regard to the exemplary methods 200 and 300 illustrated in FIGS. 2-3 and discussed previously.

The exemplary television controller 600 includes a first communication interface module 610. The first communication interface module 610 may, for example, operate to communicate over any of a variety of communication media and utilizing any of a variety of communication protocols. For example, though the first communication interface module 610 is illustrated coupled to a wireless RF antenna via a wireless port 612, the wireless medium is merely illustrative and non-limiting. The first communication interface module 610 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data (e.g., information related to a person, commerce information, etc.) is communicated. Also for example, the first communication interface module 610 may operate to communicate with local sources of television video content (e.g., video recorders, receivers, gaming devices, etc.). Additionally, for example, the first communication interface module 610 may operate to communicate with a television controller and/or a television (e.g., directly or via one or more intermediate communication networks).

The exemplary television controller 600 includes a second communication interface module 620. The second communication interface module 620 may, for example, operate to communicate over any of a variety of communication media and utilizing any of a variety of communication protocols. For example, the second communication interface module 520 may communicate via a wireless RF communication port 622 and antenna, or may communicate via a non-tethered optical communication port 624 (e.g., utilizing laser diodes, photodiodes, etc.). Also for example, the second communication interface module 620 may communicate via a tethered optical communication port 626 (e.g., utilizing a fiber optic cable), or may communicate via a wired communication port 628 (e.g., utilizing coaxial cable, twisted pair, HDMI cable, Ethernet cable, any of a variety of wired component and/or composite video connections, etc.). The second communication interface module 620 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication module 620 may operate to communicate with local sources of television video content (e.g., video recorders, receivers, gaming devices, etc.). Additionally, for example, the second communication module 620 may operate to communicate with a television controller and/or a television external to the television controller 600 (e.g., directly or via one or more intervening communication networks). The second communication interface module 620 may, for example, operate to communicate video and/or graphics information to a television and/or television receiver (e.g., using any of the previous interfaces mentioned above).

The exemplary television controller 600 may also comprise additional communication interface modules, which are not illustrated. Such additional communication interface modules may, for example, share any or all aspects with the first 610 and second 620 communication interface modules discussed above.

The exemplary television controller 600 may also comprise a communication module 630. The communication module 630 may, for example, operate to control and/or coordinate operation of the first communication interface module 610 and the second communication interface module 620 (and/or additional communication interface modules as needed). The communication module 630 may, for example, provide a convenient communication interface by which other components of the television controller 600 may utilize the first 610 and second 620 communication interface modules. Additionally, for example, in an exemplary scenario where a plurality of communication interface modules are sharing a medium and/or network, the communication module 630 may coordinate communications to reduce collisions and/or other interference between the communication interface modules.

The exemplary television controller 600 may also comprise one or more television interface modules 635 that operate to provide an interface between the television controller 600 and a television (e.g., a television external to the television controller 600). For example, the television interface module(s) 635 may operate to provide video, graphical and/or textual information to a television and/or television receiver (e.g., via the communication module 630, first communication interface module(s) 610 and/or second communication interface module(s) 620).

The exemplary television controller 600 may additionally comprise one or more user interface modules 640. The user interface module(s) 640 may generally operate to provide user interface functionality to a user of the television controller 600. For example, and without limitation, the user interface module(s) 640 may operate to provide for user control of any or all standard television commands (e.g., channel control, volume control, on/off, screen settings, input selection, etc.). The user interface module(s) 640 may, for example, operate and/or respond to user commands utilizing user interface features disposed on the television controller 600 (e.g., buttons, etc.) and may also utilize the communication module 630 (and/or first 610 and second 620 communication interface modules) to communicate with a television and/or television receiver.

The user interface module(s) 640 may also comprise one or more sensor modules that operate to interface with and/or control operation of any of a variety of sensors that may be utilized to ascertain an on-screen pointing location. For example and without limitation, the user interface module 640 (or sensor module(s) thereof) may operate to receive signals associated with respective sensors (e.g., raw or processed signals directly from the sensors, through intermediate devices, via the communication interface modules 610, 620, etc.). Also for example, in scenarios in which such sensors are active sensors (as opposed to purely passive sensors), the user interface module(s) 640 (or sensor module(s) thereof) may operate to control the transmission of signals (e.g., RF signals, optical signals, acoustic signals, etc.) from such sensors. Additionally, the user interface module(s) 640 may perform any of a variety of video output functions (e.g., presenting television programming to a user, providing visual feedback to a user regarding an identified user-selected object in the presented television programming, etc.).

The exemplary television controller 600 may comprise one or more processors 650. The processor(s) 650 may, for example, comprise a general purpose processor, digital signal processor, application-specific processor, microcontroller, microprocessor, etc. For example, the processor 650 may operate in accordance with software (or firmware) instructions. As mentioned previously, any or all functionality discussed herein may be performed by a processor executing instructions. For example, though various modules are illustrated as separate blocks or modules in FIG. 6, such illustrative modules, or a portion thereof, may be implemented by the processor 650.

The exemplary television controller 600 may comprise one or more memories 660. As discussed above, various aspects may be performed by one or more processors executing instructions. Such instructions may, for example, be stored in the one or more memories 660. Such memory 660 may, for example, comprise characteristics of any of a variety of types of memory. For example and without limitation, such memory 660 may comprise one or more memory chips (e.g., ROM, RAM, EPROM, EEPROM, flash memory, one-time-programmable OTP memory, etc.), hard drive memory, CD memory, DVD memory, etc.

Also as discussed previously, various information corresponding to user-selectable objects (e.g., objects associated with people) in television programming (e.g., descriptive information describing people, communication information, information regarding obtaining consumer goods and/or services, user interaction information, user control information, information describing interactions with local and/or remote entities and associated with user-selectable objects and related people, information related to acquisition of consumer goods and/or services, etc.) may be stored in memory. The memory 660 provides one non-limiting example of a memory in which such information may be stored. Note that such memory 660 (or a portion thereof) may also be external to the television 600 and communicatively coupled thereto.

The exemplary television controller 600 may comprise one or more modules (not explicitly illustrated in FIG. 6) that operate to receive and present a television program to a user. Such one or more modules may, for example, operate to utilize one or more of the user interface module(s) 640 to present the television program on the optional display 670 of the television controller 600 (if such display is present) and/or a display external to and communicatively coupled to the television controller 600). The one or more modules may, for example, operate to perform step 310 of the exemplary method 300 discussed previously.

The exemplary television controller 600 may comprise one or more user-selected object determination modules 654 that operate to determine an identity of a user-selected object (or an associated person, consumer good and/or service, commercial enterprise, etc.) in a television program being presented to a user. For example, such module(s) 654 may operate to perform step 220 of the exemplary method 200 discussed previously and/or step 320 of the exemplary method 300 discussed previously.

For example, in an exemplary scenario in which the television controller 600 locally determines an identify of a user-selected object, the module(s) 654 may operate to utilize one or more of the user interface module(s) 640 to interface with various sensors. Additionally, for example, the module(s) 654 may operate to utilize the communication module 630 (and communication interface modules 610 and 620) to communicate with external systems regarding various sensor signals.

Also for example, in another exemplary scenario in which the television controller 600 operates to receive information of the identity of a user-selected object in a television program from a source external to the television controller 600, the module(s) 654 may operate to utilize the communication module 630 (and communication interface modules 610 and 620) to communicate with such external source.

The exemplary television controller 600 may also, for example, comprise one or more action determination module(s) 656 that operate to determine (e.g., based at least in part on the determined identity of a user-selected object (or associated person) in a television program, one or more actions in which to engage with an entity local to and/or remote from the user's local television system. For example, such module(s) 656 may operate to perform step 230 of the exemplary method 200 discussed previously and/or step 330 of the exemplary method 300 discussed previously.

For example, in a non-limiting exemplary scenario in which such action determination comprises analyzing a table or other data structure correlating object identification characteristics (or person identification characteristics) to particular actions, the module(s) 656 may operate to analyze such a table and/or other data structure stored in the memory 660. Additionally for example, in an exemplary scenario in which such action determination comprises interacting with the user to determine an initial action and/or subsequent action related to the identified user-selected object (or associated person or people), the module(s) 656 may operate to utilize the user interface module(s) 640 to perform such user interaction.

The exemplary television controller 600 may additionally comprise one or more action performance modules 658 that operate to perform the one or more interactions determined by the action determination module(s) 656. For example, the action performance module(s) 658 may operate to perform step 240 of the exemplary method 200 discussed previously and/or step 340 of the exemplary method 300 discussed previously.

For example, in a non-limiting exemplary scenario in which a determined interaction comprises retrieving information associated with an object (or related person) from memory of an entity remote from the user's local television system (e.g., a memory of a networked entity associated with a particular person, a memory of a networked entity of a commercial enterprise related to a particular person, etc.), the module(s) 658 may operate to communicate with such memory of the remote entity (e.g., either directly, for example, utilizing DMA and/or indirectly utilizing an interface of the remote entity). For example, the module(s) 658 may operate to utilize the communication module 630 (and first communication interface module 610 and/or second communication interface module 620) to communicate with such remote entity. Such a remote entity may, for example, comprise a communication infrastructure component of a television system, a television server component, a cable and/or satellite head-end station, a networked information server, a remote computer communicatively coupled to the television, a web-server or database of a commercial enterprise, etc.

Also for example, in a non-limiting scenario in which a determined action comprises searching for information, the module(s) 658 may operate to perform a search for such information. In such a scenario, the module(s) 658 may, for example, operate to perform such a search in memory of other television system components and/or other networked entities (e.g., web-servers or databases of commercial enterprises) that are remote from the user's local television system (e.g., directly utilizing direct memory access and/or utilizing a search interface provided by a remote entity). For example, the module(s) 658 may operate to perform such a search in such remote entities utilizing the communication module 630 (and first communication interface module 610 and/or second communication interface module 620) to communicate with such remote entities. For example, such remote entities may provide an interface specifically adapted to request and/or search for information stored in and/or accessible to such remote entities. In such a scenario, the module(s) 658 may operate in accordance with such interface.

In an exemplary scenario, a remote entity may operate in accordance with a protocol in which a requestor requests (via a communication network) information associated with a particular user-selected object (or associated person), and the remote entity responds to such a request by communicating the requested information back to the requestor. In such a scenario, the module(s) 658 would operate in accordance with such protocol when interacting with the remote entity via the communication network.

Additionally for example, in a non-limiting scenario in which a determined action comprises interfacing with a user of the television controller 600, the module(s) 658 may operate to utilize the user interface module(s) 640 to provide the user interface.

For example, in an exemplary scenario in which a determined action comprises presenting object information (e.g., information of a person) and/or different views of the object to a user, the module(s) 658 may operate to utilize the user interface module(s) 640 to perform such output (e.g., on the optional display 670 of the television controller 600 if such a display 670 is included). Also for example, the module(s) 658 may operate to utilize the communication module 630 (and first communication interface module 610 and/or second communication interface module 620) to communicate with one or more other local television system components (e.g., a television, television receiver, personal computing device or system, etc. coupled to the television controller 600) to provide such information to such one or more other local television system components for presentation on respective output displays of such one or more other local television system components.

Further for example, in a non-limiting scenario in which a determined action comprises establishing and/or managing a communication session between the user and another system entity, the module(s) 658 may operate to utilize the user interface module(s) 640 to provide the user interface and utilize the communication module(s) 630 (and first communication interface module 610 and/or second communication interface module 620) to communicate to perform communication link establishment and/or management.

Still further for example, in a non-limiting scenario in which a determined action comprises notifying one or more other television system and/or other networked entities of the user's selection of the user-selected object (e.g., a networked entity associated with a person, a networked entity associated with an organization that is associated with a person, a production enterprise, a distribution enterprise, a rating company, an advertising agency, etc.), the module(s) 658 may operate to utilize the communication module(s) 630 (and first communication interface module 610 and/or second communication interface module 620) to perform such notification.

Though not illustrated, the exemplary television controller 600 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 654, 656 and 658) may be performed by the processor(s) 650 executing instructions stored in the memory 660.

Though the previous discussions of FIGS. 4-6 presented various exemplary modules of a television 400, television receiver 500 and television controller 600, as discussed previously, various aspects of the present invention may be performed in a distributed system (e.g., by a plurality of components of the user's local television system). Accordingly, the scope of various aspects of the present invention should not be limited to performance by a single television system component (or device) unless explicitly claimed.

Figure 7:
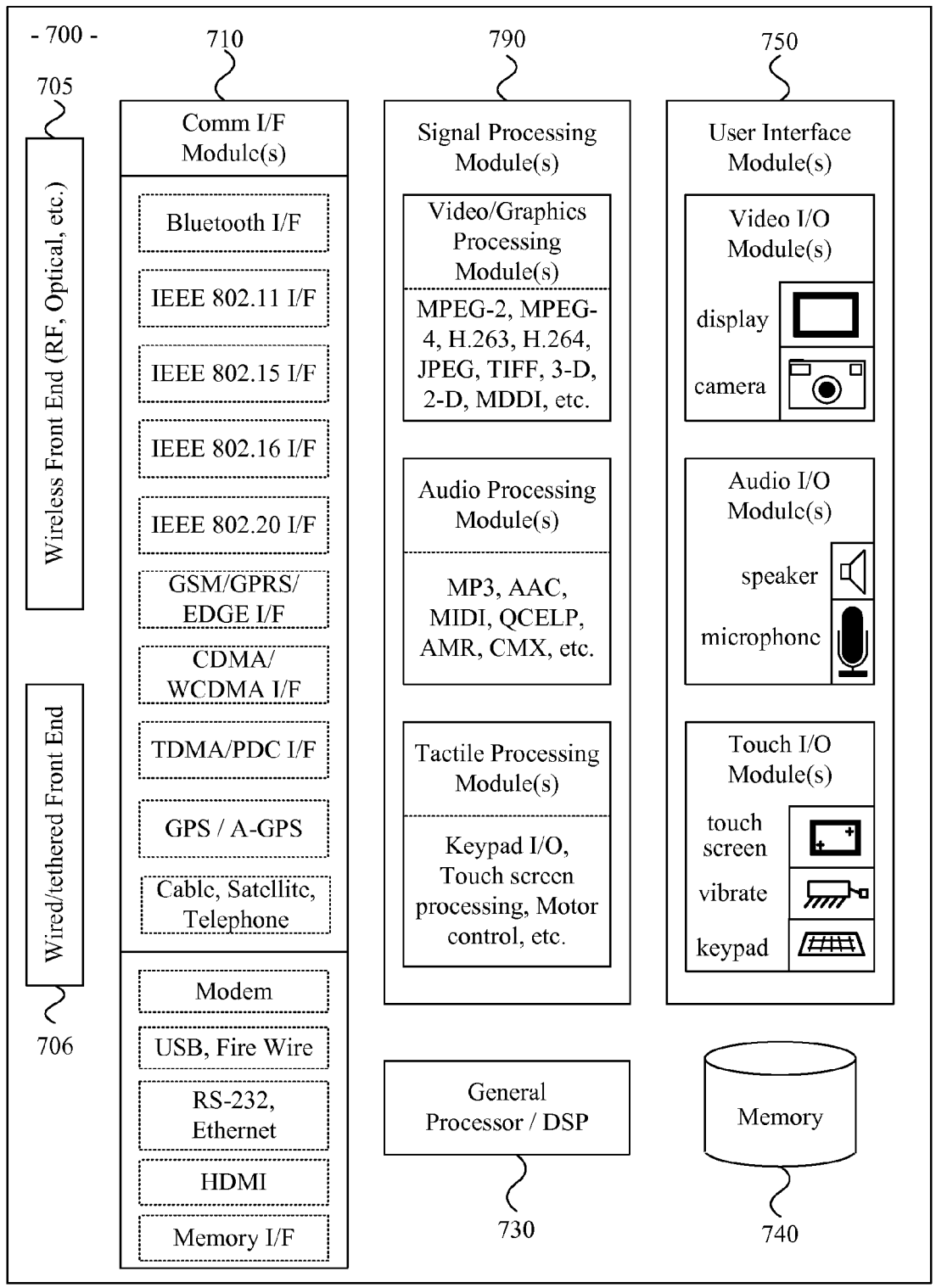
FIG. 7 is a diagram illustrating exemplary modules and/or sub-modules for a local television system, in accordance with various aspects of the present invention.

Turning next to FIG. 7, such figure is a diagram illustrating exemplary modules and/or sub-modules for a local television system 700, in accordance with various aspects of the present invention. The exemplary local television system 700 may share any or all aspects with any of the television 400, television receiver 500 and/or television controller 600 illustrated in FIGS. 4-6 and discussed above. The exemplary local television system 700 may, for example, share any or all characteristics with one or more of the exemplary televisions 140 and 141, television controllers 160 and 161, television receiver 151, television provider 110 and/or third party program information provider illustrated in FIG. 1 and discussed previously. Also, the exemplary local television system 700 (e.g., various modules thereof) may operate to perform any or all of the functionality discussed previously with regard to the exemplary methods 200 and 300 illustrated in FIGS. 2-3 and discussed previously. The components of the exemplary local television system 700 may be disposed in a single television system component (e.g., a single television, a single television receiver, a single television controller, etc.) or dispersed in a plurality of television system components (e.g., a plurality of components of a user's local television system, a combination of components comprising one or more components of the user's local television system and one or more components remote to the user's local television system, etc.).

For example, the local television system 700 comprises a processor 730. Such a processor 730 may, for example, share any or all characteristics with the processors 450, 550 and 650 discussed with regard to FIGS. 4-6. Also for example, the local television system 700 comprises a memory 740. Such memory 740 may, for example, share any or all characteristics with the memory 460, 560 and 660 discussed with regard to FIGS. 4-6.

Also for example, the local television system 700 may comprise any of a variety of user interface module(s) 750. Such user interface module(s) 750 may, for example, share any or all characteristics with the user interface module(s) 440, 540 and 640 discussed previously with regard to FIGS. 4-6. For example and without limitation, the user interface module(s) 750 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary local television system 700 may also, for example, comprise any of a variety of communication modules (705, 706, and 710). Such communication module(s) may, for example, share any or all characteristics with the communication interface module(s) 410, 420, 510, 520, 610 and 620 discussed previously with regard to FIGS. 4-6. For example and without limitation, the communication interface module(s) 710 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wireline and/or cable modem, etc.); any of a variety of communication interface modules related to communicating with external memory devices; etc. The exemplary local television system 700 is also illustrated as comprising various wired 706 and/or wireless 705 front-end modules that may, for example, be included in the communication interface modules and/or utilized thereby.

The exemplary local television system 700 may also comprise any of a variety of signal processing module(s) 790. Such signal processing module(s) 790 may share any or all characteristics with modules of the exemplary television 400, television receiver 500 and/or television controller 600 that perform signal processing. Such signal processing module(s) 790 may, for example, be utilized to assist in processing various types of information discussed previously (e.g., with regard to sensor processing, position determination, video processing, image processing, audio processing, general user interface information data processing, etc.). For example and without limitation, the signal processing module(s) 790 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., Keypad I/O, touch screen processing, motor control, etc.).

In summary, various aspects of the present invention provide a system and method in a television system for providing information associated with a user-selected person in a television program. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method, in a television system, for responding to user selection of an object in television programming, the method comprising:
    by the television system:
        determining an identity of a user-selected object in a television program being presented to a user on a first display device, where the user-selected object corresponds to a selected person;
        determining, based at least in part on the determined object identity, one or more actions to perform related to the selected person, the one or more actions comprising displaying, on a second display device, a form of communication with which to communicate with the selected person or an associate of the selected person; wherein the form of communication comprises email, fax, live chat, instant messaging, telephone call, or video phone call; and
        performing the determined one or more actions.

2. The method of claim 1, wherein said determining one or more actions comprises determining one or more potential actions, and presenting the determined one or more potential actions to the user for user-selection of at least one of the determined one or more potential actions.

3. The method of claim 1, wherein the determined one or more actions comprise providing information related to the selected person to the user.

4. The method of claim 3, wherein the information related to the selected person comprises information about the selected person.

5. The method of claim 3, wherein the information related to the selected person comprises information about an entity associated with the selected person.

6. The method of claim 3, wherein said step of providing information related to the selected person to the user comprises outputting the information related to the selected person on a television screen.

7. The method of claim 1, wherein the determined one or more actions comprise:
    acquiring, via a communication network, information related to the selected person; and presenting the acquired information to the user.

8. The method of claim 7, wherein said acquiring comprises communicating with an information server of a commercial enterprise associated with the selected person.

9. The method of claim 1, wherein the determined one or more actions comprise communicating information to a networked entity remote from the user's local television system regarding the user's selection of the user-selected object.

10. The method of claim 9, wherein said communicating information to a networked entity remote from the user's local television system enterprise comprises communicating information about the user to the networked entity.

11. The method of claim 1, wherein the determined one or more actions comprise managing two-way communication between the user and a networked entity remote from the user's local television system regarding the selected person.

12. The method of claim 1, wherein said identity determining, said action determining, and said action performing are performed in a user's local television system.

13. The method of claim 12, wherein said identity determining, said action determining, and said action performing are performed in a television system component separate from a television.

14. The method of claim 1, comprising providing a user interface by which the user may control the manner in which the determined one or more actions are performed.

15. The method of claim 1, comprising: receiving data associating a user-selectable object in the television program with a network address of a networked entity; and storing the received data in memory of a user's local television system.

16. The method of claim 1, wherein receiving user input relating to a form of communication with which to communicate with the selected person or an associate of the selected person comprises receiving user input relating to the form of communication with which to communicate with the selected person.

17. The method of claim 16, wherein receiving user input relating to a form of communication with which to communicate with the selected person or an associate of the selected person comprises receiving user input relating to the form of communication with which to communicate with the associate of the selected person.

18. The method of claim 1, wherein the second display device is a television controller.

19. The method of claim 1, wherein the second display device is based on a user preference, and the second display device is one of a television controller, mobile phone, or a personal computer.

20. A television system for responding to user selection of an object in television programming, the television system comprising:
    at least one processor operable to, at least:
        determine an identity of a user-selected object in a television program being presented to a user, where the user-selected object corresponds to a selected person;

determine, based at least in part on the determined object identity, one or more actions to perform associated with the selected person, the one or more actions comprising displaying, on a second display device, a form of communication with which to communicate with the selected person or an associate of the selected person, while continuing to present the television program to the user; wherein the form of communication comprises email, fax, live chat, instant messaging, telephone call, or video phone call; and perform the determined one or more actions.

21. The television system of claim 20, wherein said at least one processor is operable to determine one or more actions by, at least in part, operating to determine one or more potential actions, and present the determined one or more potential actions to the user for user-selection of at least one of the determined one or more potential actions.

22. The television system of claim 20, where the determined one or more actions comprise providing information related to the selected person to the user.

23. The television system of claim 22, where the information related to the selected person comprises information about the selected person.

24. The television system of claim 22, where the information related to the selected person comprises information about an entity associated with the selected person.

25. The television system of claim 20, further comprising: acquiring, via a communication network, information related to the selected person, wherein said acquiring comprises communicating with an information server of a commercial enterprise associated with the selected person; and presenting the acquired information to the user.

26. The television system of claim 20, where the determined one or more actions comprise communicating information to a networked entity remote from the user's local television system regarding the user's selection of the user-selected object.

27. The television system of claim 26, where said communicating information to a networked entity remote from the user's local television system comprises communicating information about the user to the networked entity.

28. The television system of claim 20, where the determined one or more actions comprises managing two-way communication between the user and a networked entity remote from the user's local television system regarding the selected person.

29. The television system of claim 20, wherein said at least one processor is located in a user's local television system.

30. The television system of claim 29, wherein said at least one processor is located in a television system component separate from a television.

31. The television system of claim 20, wherein the at least one processor is operable to provide a user interface by which the user may control the manner in which the determined one or more actions are performed.

32. The television system of claim 20, wherein the at least one processor is operable to: receive data associating a user-selectable object in the television program with a network address of a networked entity; and store the received data in memory of a user's local television system.

33. The television system of claim 20, wherein the television program is presented on a first display device and the form of communication is displayed on a second display device.

* * * * *